United States Patent
Taniguchi et al.

[19]

[11] Patent Number: 6,115,001
[45] Date of Patent: Sep. 5, 2000

[54] ANTENNA DEVICE

[75] Inventors: Tatsuaki Taniguchi; Kazuo Shigeta, both of Hiroshima-ken, Japan

[73] Assignee: Mazda Motor Corporation, Hiroshima, Japan

[21] Appl. No.: 09/132,816

[22] Filed: Aug. 12, 1998

[30]     Foreign Application Priority Data

Aug. 2, 1997   [JP]   Japan .................................. 9-237272

[51] Int. Cl.⁷ ..................................................... H01Q 1/32
[52] U.S. Cl. ................................. 343/713; 343/700 MS; 343/866
[58] Field of Search ............................. 343/700 MS, 713, 343/866, 702, 841, 842, 741; 455/550; 342/357; H01Q 1/32

[56]            References Cited

U.S. PATENT DOCUMENTS 4,698,638  10/1987  Branigan et al. ........................ 343/725
5,563,616  10/1996  Dempsey et al. ........................ 343/753
5,768,217   6/1998  Sonoda et al. ............................ 368/10
5,918,183   6/1999  Janky et al. ............................. 455/550
5,949,381   9/1999  Saitoh et al. ............................ 343/713

FOREIGN PATENT DOCUMENTS 3-72702   3/1991   Japan .
5-22030   1/1993   Japan .
 5-6380   1/1993   Japan .
5-192912  8/1993   Japan .

*Primary Examiner*—Don Wong
*Assistant Examiner*—Shih-Chao Chen

[57]            ABSTRACT

An earth configuration achieving easy installment without deteriorating performance of an antenna device. The antenna device has a balanced antenna element, a shield plate arranged between the balanced antenna element and a conductor of a car, and a supporting member, and the shield plate blocks electrical coupling of the conductor from the balanced antenna element when the antenna device is mounted on the body of the car.

16 Claims, 38 Drawing Sheets

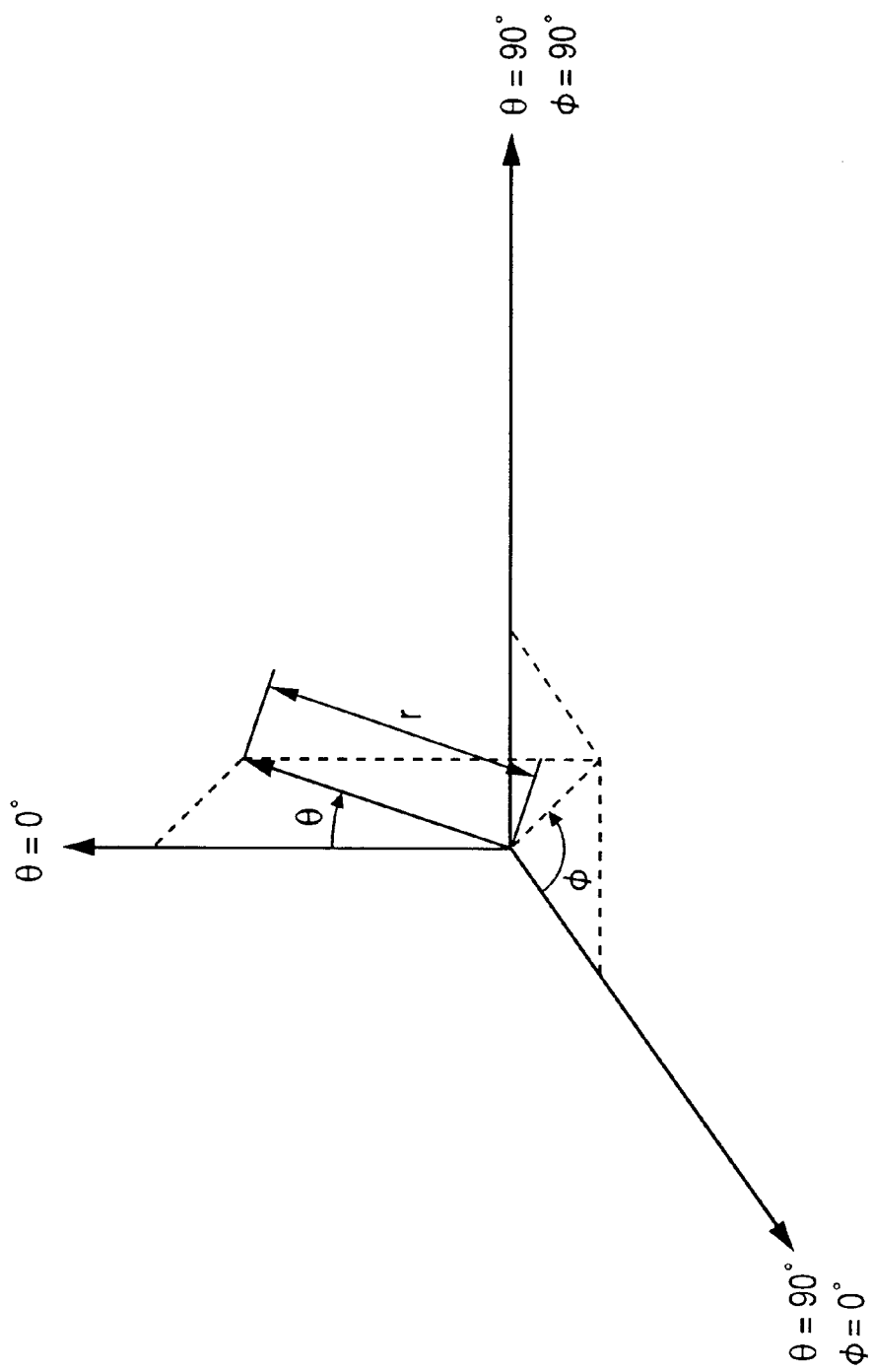

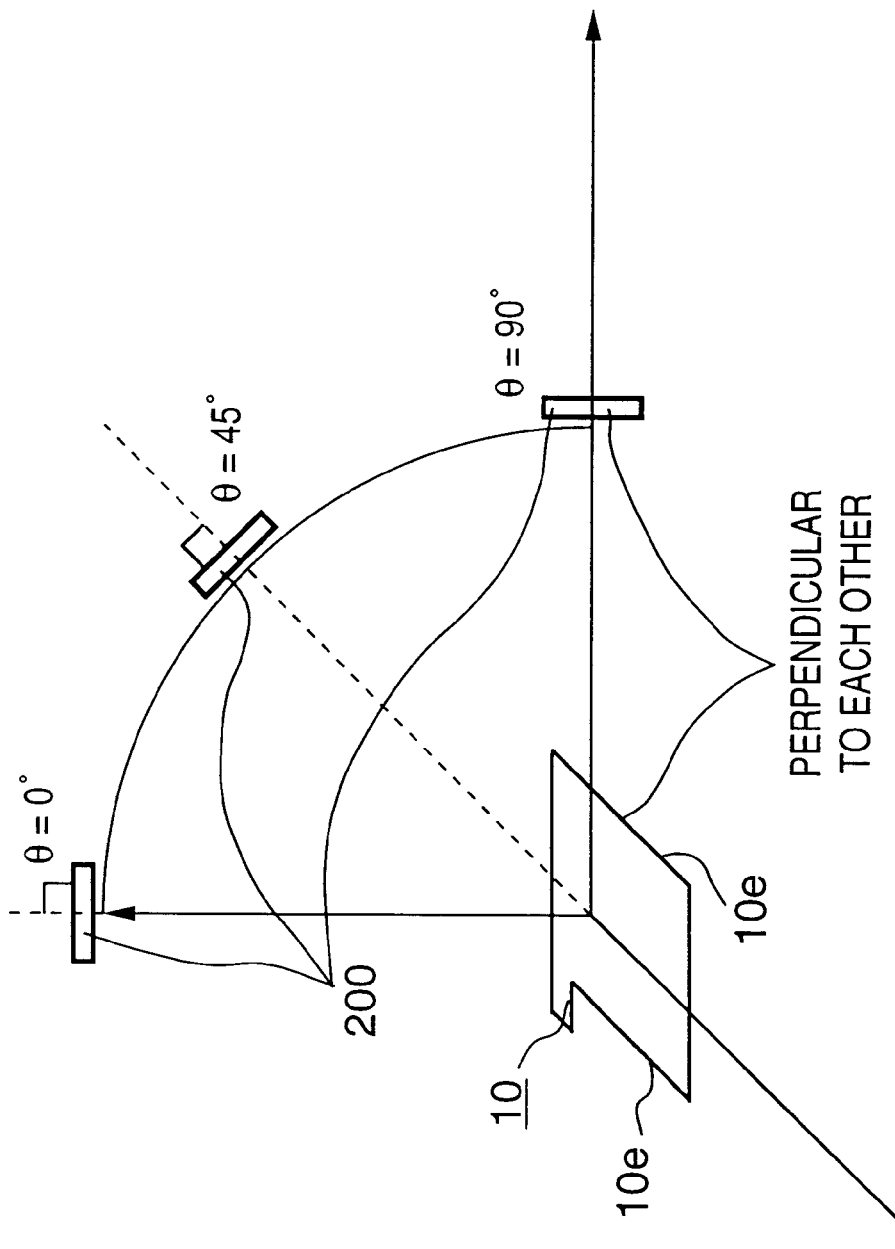

D = 10mm

D = 20mm

D = 30mm

D = 40mm

D = 50mm, φ = 90°

D = 100mm, φ = 90°

D = 150mm, φ = 90°

D = 200mm, φ = 90°

IN FREE SPACE, $\phi = 90°$

D1 = 10

D1 = 20

D1 = 30

D1 = 40

D1 = 50mm

D1 = 100mm

D1 = 150mm

D1 = 200mm

IN FREE SPACE $D_2/\lambda = 0.03$ $D_2/\lambda = 0.04$ $D_2/\lambda = 0.05$ $D_2/\lambda = 0.06$ $D_2/\lambda = 0.07$ $D_2/\lambda = 0.08$

D2/λ = 0.09

D2/λ = 0.1

$D_2/\lambda = 0.15$ $D_2/\lambda = 0..25$ $D_2/\lambda = 0.5$ $D_2/\lambda = 1$

GP = INFINITE, φ = 90

GP = 100mm×100mm, φ = 90

GP = 90mm×90mm, φ=90

GP = 80mm×80mm, φ=90

GP = 70mm×70mm、 φ=90

GP = 60mm×60mm、 φ=90

GP = 50mm×50mm, φ=90

GP = 40mm×40mm, φ=90

GP=INFINITE, φ=90

GP=100×100, φ=90

GP=90×90, φ=90

GP=80×80, φ=90

GP=70×70, φ=90

GP=60×60, φ=90

GP=50×50, φ=90

GP=40×40, φ=90

ANTENNA DEVICE

BACKGROUND OF THE INVENTION

1. Field of the Invention

The present invention relates to an antenna device for, e.g., a vehicle, and more particularly to an antenna device having a balanced configuration, such as an antenna for a global positioning system (GPS antenna) of, e.g., an on-vehicle navigation apparatus, applicable to a vehicle.

2. Description of the Related Art

Generally, an on-vehicle antenna of the an unbalanced antenna type is commonly used.

For example, microstrip antennas are disclosed in Japanese Patent Application Laid-Open Nos. 5-22030, 5-192912, and Japanese Utility Model Gazette (Kokai) No. 5-6380 as unbalanced antennas.

In an unbalanced antenna, each side of an antenna plate, provided in parallel to an earth plate, must have a length equal or greater than $\lambda/2$, where $\lambda$ is a wavelength of a radio wave to be received; therefore, the size of the antenna is large.

In Japanese Patent Application Laid-Open No. 5-192912, dielectric is inserted between an antenna plate and an earth plate in order to reduce the size of an unbalanced antenna. However, raw material cost and processing cost for forming the dielectric is very high, which makes the antenna expensive.

As an antenna which can be down-sized and supplied at a low price, balanced antennas are attracting attention.

In the balanced antenna, especially in a loop antenna, the length of one cycle of the loop must be designed to match $\lambda$, where $\lambda$ is the wavelength of a radio wave to be received; accordingly, it is an advantage of the balanced antenna that the size of the antenna is reduced without using expensive dielectric. Further, the balanced antenna does not have to have an earth (earth plate), which is different from an unbalanced antenna; accordingly, it is an advantage of the balanced antenna that it is unnecessary to ground the antenna when installing the antenna on, e.g., a vehicle.

FIGS. 1A and 1B show a configuration of a conventional loop antenna. FIG. 1A is a top view of an antenna element, and FIG. 1B is a side view of the antenna element.

Generally, a balanced antenna 10 having a shape as shown in FIG. 1A has a directivity as shown in FIG. 2I in free space (i.e., substantially no metal conductor exists in periphery area).

Note, measurement of the directivity, whose result is shown in FIG. 2I, is performed in the polar coordinate system as shown in FIG. 1D. Further, in FIG. 2I, $E_{74}$ (shown by a black diamonds) and $E_\phi$ (shown by squares) show sensitivity of the antenna 10 measured when an originator of a radio wave is at angles $\theta$ and $\phi$, respectively, as in FIGS. 1E and 1D. More specifically, $E_{74}$ is the sensitivity measured when the loop antenna 10, which is the subject of the measurement, is arranged at the origin in the horizontal plane, and a dipole antenna 200, which is the originator of a radio wave, is arranged perpendicular to effective pieces 10e of the antenna 10, as shown in FIG. 1E. For example, the dipole antenna at $\theta=90$ degrees is orthogonal to the effective pieces 10e of the antenna 10 and normal to the horizontal plane. Further, when $\theta=0$ degree, the dipole antenna is orthogonal to the effective pieces of the antenna 10, but parallel to the horizontal plane. $E_\theta$ ($\phi=90$ degrees) is the sensitivity measured when the loop antenna 10, which is the subject of measurement, is arranged on the origin in the horizontal plane, and the dipole antenna, which is the originator of a radio wave, is arranged parallel to the effective pieces 10e of the antenna 10 as shown in FIG. 1F. Thus, the dipole antenna is parallel to the effective pieces 10e when $\theta$ is, e.g., 0, 45, or 90 degrees.

The inventors of the present invention carried out an experiment on the loop antenna 10, shown in FIGS. 1A and 1B, under conditions as shown in FIG. 1C. Specifically, a metal conductor 100 is placed at a distance D from the antenna 10 in parallel to the antenna 10. The metal conductor 100 practically corresponds to metal of harness and body of a vehicle.

As a result of the experiment as shown in FIG. 1C, performance of the antenna 10 was affected by the peripheral conductor, such as the harness and body of the vehicle (i.e., the conductor 100), and the directivity of the antenna 10 was greatly deformed from the directivity shown in FIG. 2I.

FIGS. 2A to 2H show the directivity of the antenna 10 when the antenna 10, a loop balanced antenna shown in FIG. 1A, is placed at a distance D from the metal conductor 100, which acts as an earth plate of infinite size, where the distance D is changed. Note, the sensitivity in FIGS. 2A to 2H is shown in the same manner as FIG. 2I.

Referring to FIGS. 2A to 2H, the balanced antenna 10 shows relatively preferable characteristics as shown in FIGS. 2D and 2E; however, the directivity of the antenna 10 is often affected by the metal conductor 100, as shown in FIGS. 2F to 2H, thus it is not substantially suitable for practical use.

Further, the directivity of the antenna 10 may be affected by relative positions between the antenna 10 and the conductor 100, and would change greatly in response to slight displacement of the conductor 100 or slight misplacement of the mounting position of the antenna 10. Further, in an antenna, such as a GPS antenna, which requires directivity in a specific direction (upward, in the GPS antenna), when the distance to a conductor is changed due to the misplacement of the mounting position of the antenna, the required directivity is not achieved because of the effect of the conductor.

Especially, for mounting the GPS antenna on a vehicle, it is necessary to arrange a balanced antenna element of the GPS antenna within an instrument panel which includes many metal conductors, such as an instrument panel member and a harness; therefore, the foregoing problem is very serious.

The applicants of the present invention suggested a balanced antenna having a reflector in Japanese Patent Application Laid-Open No. 3-72702. However, the reflector is aimed at preventing a radio wave, originated from the balanced antenna, from reaching driver and passenger, and not at solving the foregoing problem.

SUMMARY OF THE INVENTION

The present invention has been made in consideration of the above situation, and has as its object to provide a small and inexpensive antenna device capable of easily removing effects of an external conductor while maintaining good directivity.

According to the present invention, the foregoing object is attained by providing an antenna device comprising: a balanced antenna element; and an antenna member, arranged between the balanced antenna element and a conductor of an external apparatus when the balanced antenna element is mounted on the external apparatus, for blocking electrical coupling of the conductor with the balanced antenna element.

Accordingly, by using the balanced antenna, cost reduction and size reduction are achieved, further, a good directivity is achieved. Furthermore, the antenna member can remove effects of the external conductor without affecting the directivity of the antenna element.

According to an aspect of the present invention, the balanced antenna element receives GPS signals. Since the antenna member does not affect the directivity of the antenna element, the antenna device is suitable for a GPS antenna which requires directivity in a single direction.

According to another aspect of the present invention, the balanced antenna element has a loop shape. By using the loop antenna, size reduction of the antenna is achieved.

According to another aspect of the present invention, the antenna member has a plate conductor member provided independent of the balanced antenna element; accordingly, a better directivity is achieved.

According to another aspect of the present invention, an earth member for grounding the antenna member and the conductor is further provided. By grounding the antenna member, it is possible to achieve a better directivity. In addition, with this configuration, the antenna can be mounted on a conductor of a vehicle.

According to another aspect of the present invention, an effective area of the plate conductor member perpendicular to the direction toward the external apparatus from the plate conductor member is greater than an effective area of the balanced antenna element perpendicular to the direction; accordingly, it is possible to secure the effect of the antenna member (plate conductor member).

According to another aspect of the present invention, the antenna member has a supporting member for supporting the plate conductor member at a predetermined distance from the balanced antenna element so as to be isolated from the balanced antenna element; accordingly, a better directivity is achieved regardless of how the antenna is mounted on a vehicle.

According to another aspect of the present invention, the antenna member includes a supporting member for supporting the plate conductor member at a predetermined distance from the balanced antenna element so as to be isolated from the balanced antenna element, and the supporting member is filled between the balanced antenna element and the plate conductor member with insulating material; accordingly, it is possible to separate the plate conductor member and the balanced antenna at a predetermined distance with a simple configuration.

According to another aspect of the present invention, the supporting member supports the plate conductor member and the balanced antenna element so as to be substantially parallel to each other; accordingly, the antenna device is further down-sized.

According to another aspect of the present invention, the plate conductor member is metal plate; accordingly, it is possible to reduce the cost and weight of the antenna device.

According to another aspect of the present invention, the plate conductor member is formed by a metal net; accordingly, the weight of the antenna device is reduced.

According to another aspect of the present invention, each mesh of the metal net is designed smaller than about one-tenth of wavelength $\lambda$ of a radio wave of interest; accordingly, a better directivity is achieved.

According to another aspect of the present invention, an effective area of the plate conductor member is set larger than $9\lambda^2/64$ when wavelength of a radio wave of interest is $\lambda$; accordingly, it is possible to increase freedom of the shape of the plate conductor member by setting the area of the plate conductor member to a fixed value.

According to another aspect of the present invention, the plate conductor member has a rectangular shape whose sides are equal or longer than $3\lambda/8$; accordingly, a better directivity is achieved.

According to another aspect of the present invention, the plate conductor member is a square; accordingly, a better directivity is achieved.

According to another aspect of the present invention, a fitting member for mounting the antenna member on a vehicle is further provided; accordingly, it is possible to increase freedom of a mount position on a vehicle. Further, a good directivity is achieved regardless of the mounting position of the antenna device on the vehicle. Especially, this configuration is suitable for a GPS antenna which requires many limitation on the mount position.

According to another aspect of the present invention, the fitting member fixes the antenna member so that the antenna member is below the balanced antenna element; accordingly, it is possible to increase freedom of a mount position on a vehicle while securing upward directivity.

According to another aspect of the present invention, the antenna member has a conductor member having function of blocking electrical coupling, and the fitting member fixes the antenna member so that the conductor member is isolated from the conductor of the external device; accordingly, freedom of a mount position increases since it is not necessary to ground the plate by connecting to a vehicle.

According to another aspect of the present invention, the fitting member has an adhesive layer; accordingly, the antenna device is mounted easily with a simple configuration.

According to another aspect of the present invention, a cover for covering the antenna member is provided; accordingly, the balanced antenna does not short to a conductor of a vehicle. Accordingly, a user does not have to worry about the danger upon mounting the antenna device on the vehicle.

According to another aspect of the present invention, the antenna member is arranged inside of an instrument panel of a vehicle. Accordingly, a good directivity is achieved when the antenna device is arranged in the instrument panel.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1D is a view showing the coordinate system used in the experiment shown in FIG. 1C (and in the experiments on antenna devices in embodiments);

FIG. 1E is a view showing definition of $E_\theta$;

DETAILED DESCRIPTION OF THE PREFERRED EMBODIMENTS

An antenna device of the present invention applied to an antenna for a car is explained as the first embodiment, an antenna device when a metal net which functions as a shield plate is used is explained as the second embodiment, and an antenna device of the present invention applied to a GPS reception antenna is explained as the third embodiment in accordance with the accompanying drawings.

<First Embodiment>

Figure 3A:
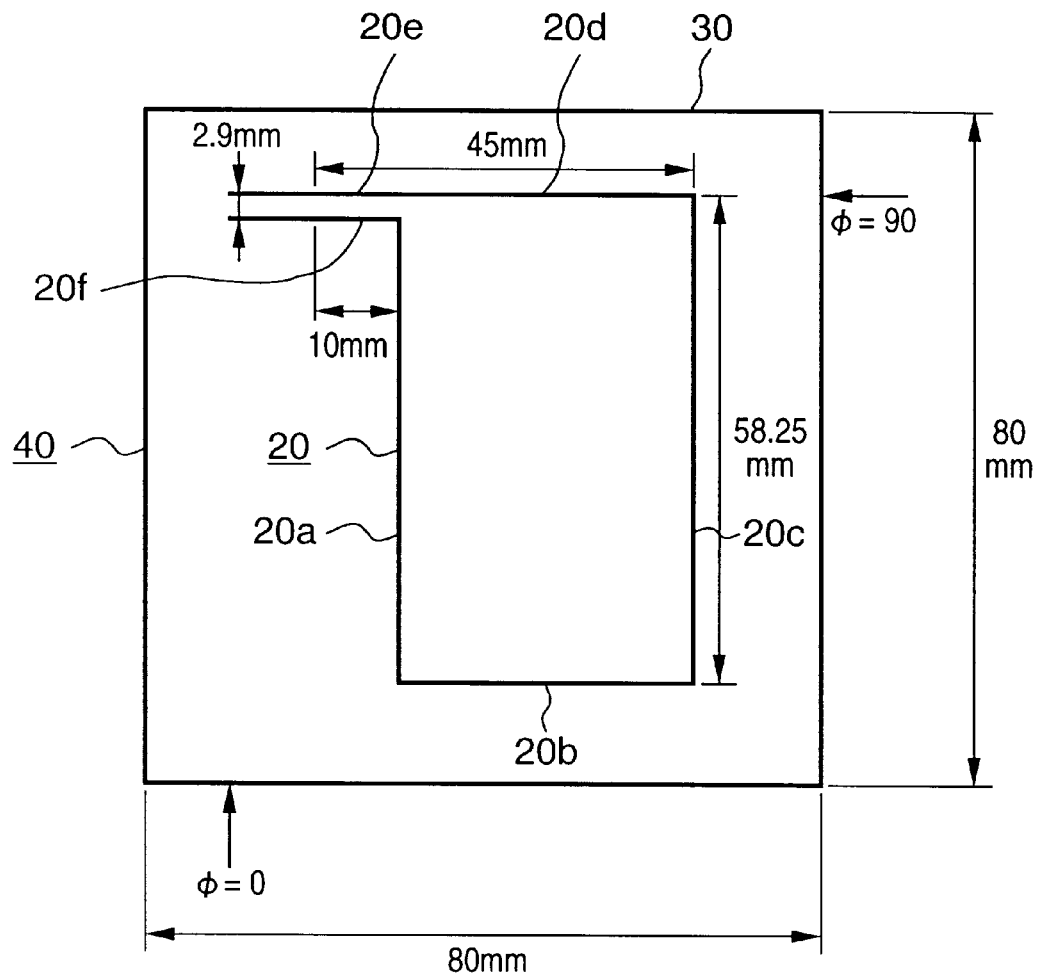
FIG. 3A is a top view showing a shape of an antenna device according to a first embodiment.
Figure 3B:
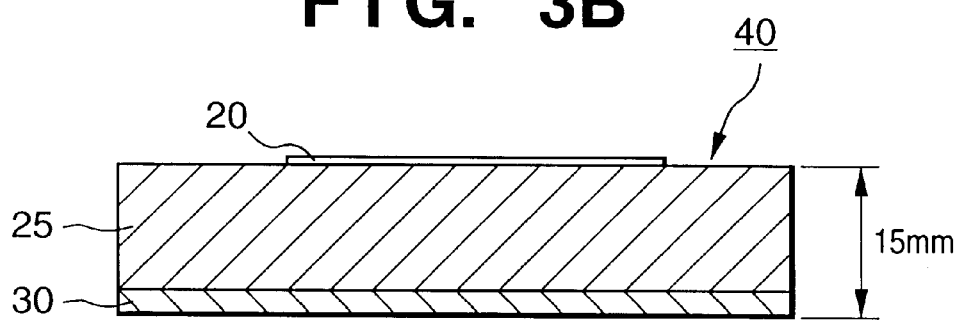
FIG. 3B is a side view showing the shape of the antenna device according to the first embodiment.
Figure 3C:
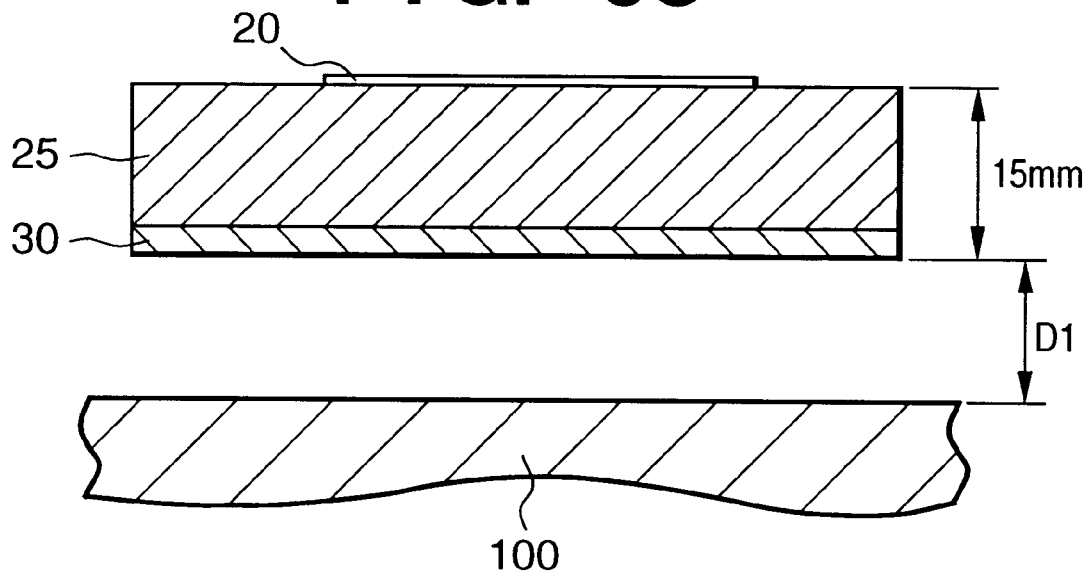
FIG. 3C is a side view showing relationship between the antenna device and a vehicle according to the first embodiment.
Figure 3D:
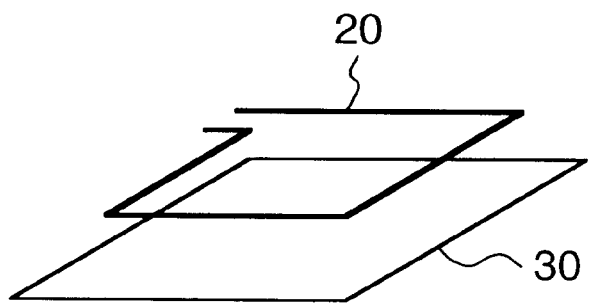
FIG. 3D is a perspective view of the antenna device according to the first embodiment.

A configuration of an antenna device according to the first embodiment is shown in FIGS. 3A, 3B and 3D. FIG. 3A is a top view, FIG. 3B is a side view, and FIG. 3D is a perspective view of the antenna device. Note, a supporting member 25 is not shown in FIG. 3D for the sake of illustrative convenience.

The antenna device according to the first embodiment comprises an antenna element 20 having substantially a rectangular shape and functioning as a loop antenna, a metal plate (shield plate) 30 arranged in parallel to the plane of the antenna element 20 at a predetermined distance from the antenna, and a supporting member (foamed plastic in the first embodiment) 25 which is sandwiched between the antenna element 20 and the shield plate 30 and supports them.

The size of the antenna element 20, specifically, the size of the portion which practically functions as an antenna, in the first embodiment is 58.25 mm in length and 45 mm in width. Further, lead wires 20e and 20f, each having the length of 10 mm, are connected to element pieces 20d and 20a, respectively.

Next, the shape of the shield plate 30 is explained. Principally, the shield plate 30 is preferably parallel to the antenna element 20, and should have an area to cover the antenna element 20, at least. The shield plate 30 shown in FIGS. 3A or 3B in the first embodiment is a square, 80 cm each side, for instance.

The size of the antenna element 20 must be equal to or smaller than the size of the shield plate 30, i.e., the antenna element 20 can lie entirely within the shield plate 30. When the antenna element 20 and the shield plate 30 are positioned over the metal conductor (e.g., body of a vehicle), the shield plate 30 must be positioned such that the antenna element 20 is shielded from any radiation from the metal conductor. In other word, if planes are constructed, four planes, one on each side of the shield plate, such that the edges of the metal conductor and the respective edges of the shield plate are within the planes; the antenna element 20 is positioned to be fully within the extension of these planes.

Figure 4A:
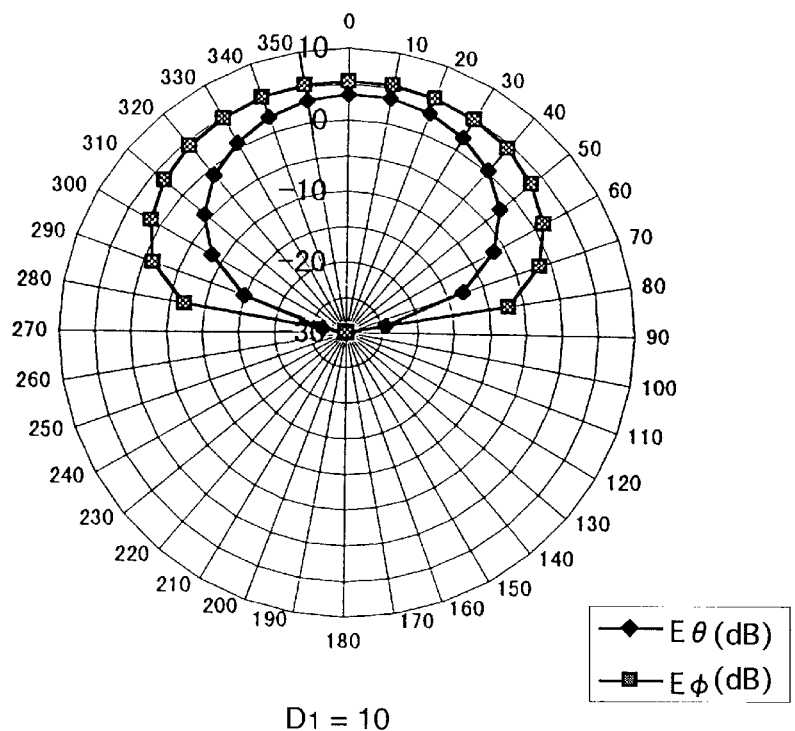
FIG. 4A is a graph showing directivity of the antenna device according to the first embodiment ($D_1$=10 mm)
Figure 4B:
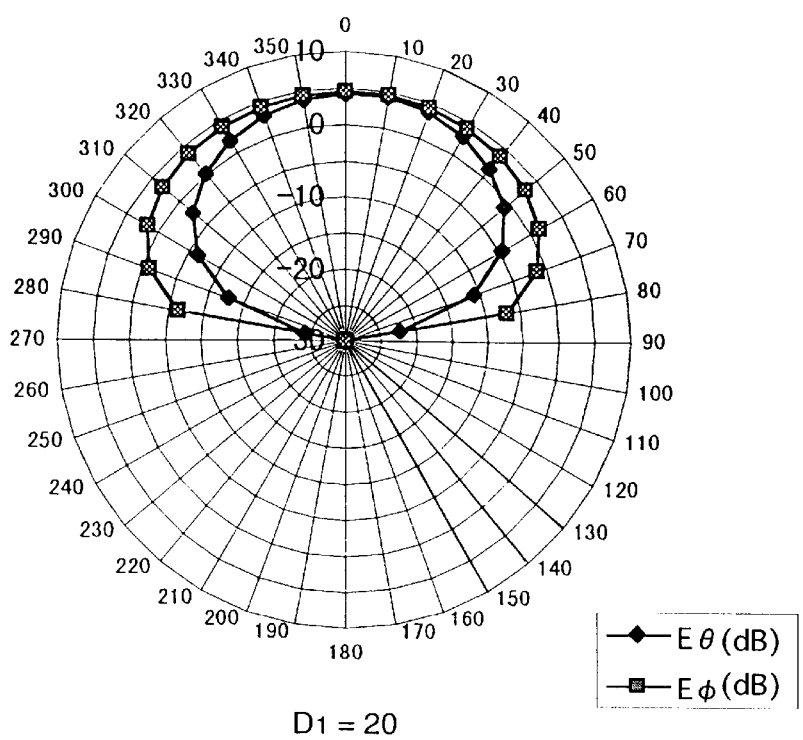
FIG. 4B is a graph showing directivity of the antenna device according to the first embodiment ($D_1$=20 mm)
Figure 4C:
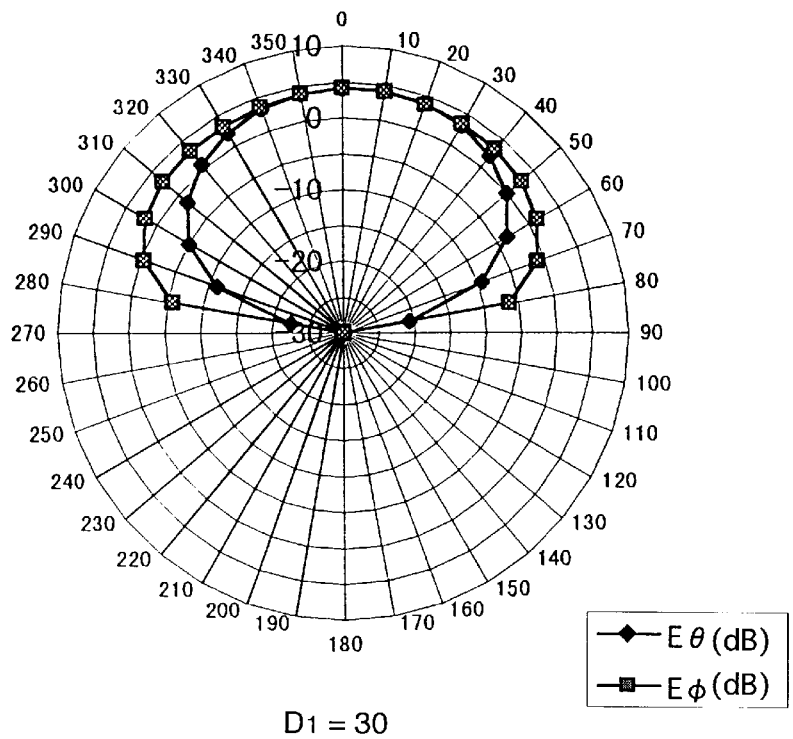
FIG. 4C is a graph showing directivity of the antenna device according to the first embodiment ($D_1$=30 mm)
Figure 4D:
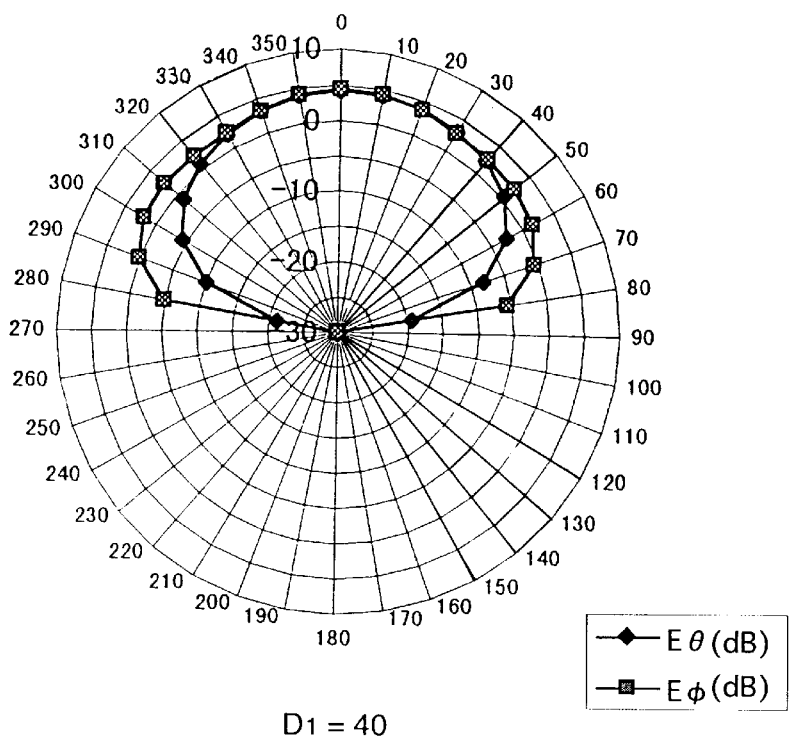
FIG. 4D is a graph showing directivity of the antenna device according to the first embodiment ($D_1$=40 mm)
Figure 4E:
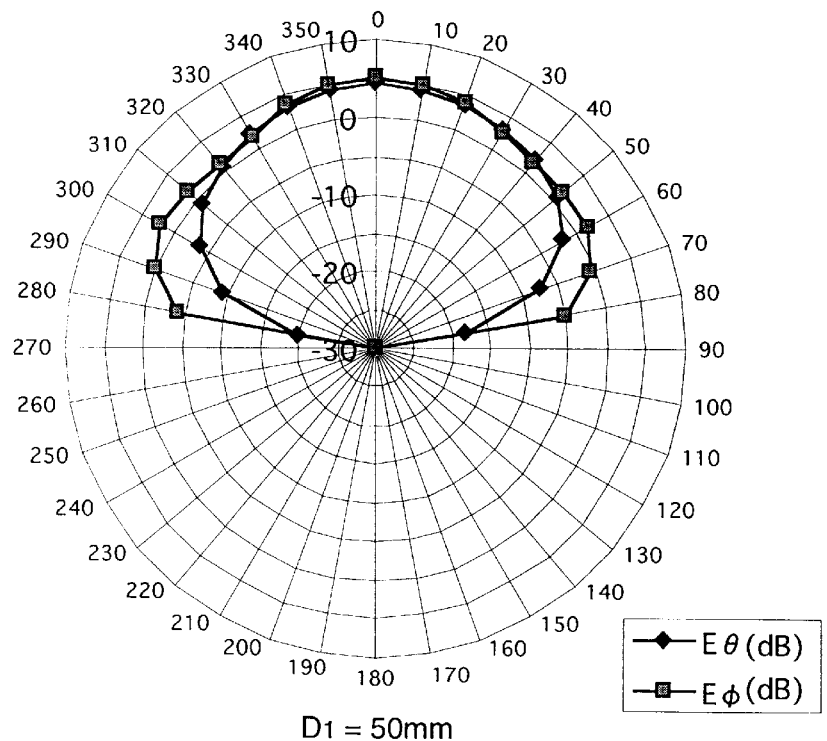
FIG. 4E is a graph showing directivity of the antenna device according to the first embodiment ($D_1$=50 mm)
Figure 4F:
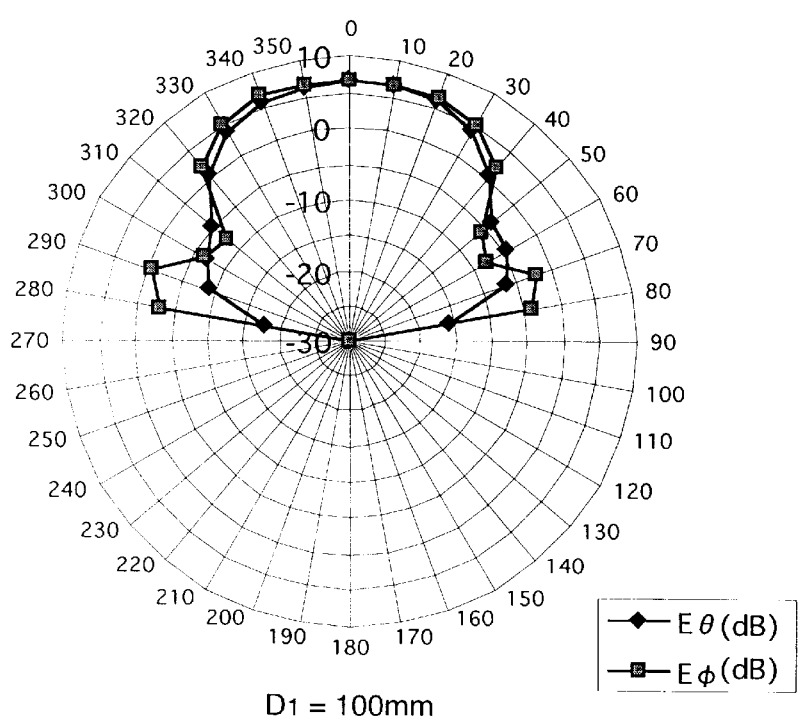
FIG. 4F is a graph showing directivity of the antenna device according to the first embodiment ($D_1$=100 mm)
Figure 4G:
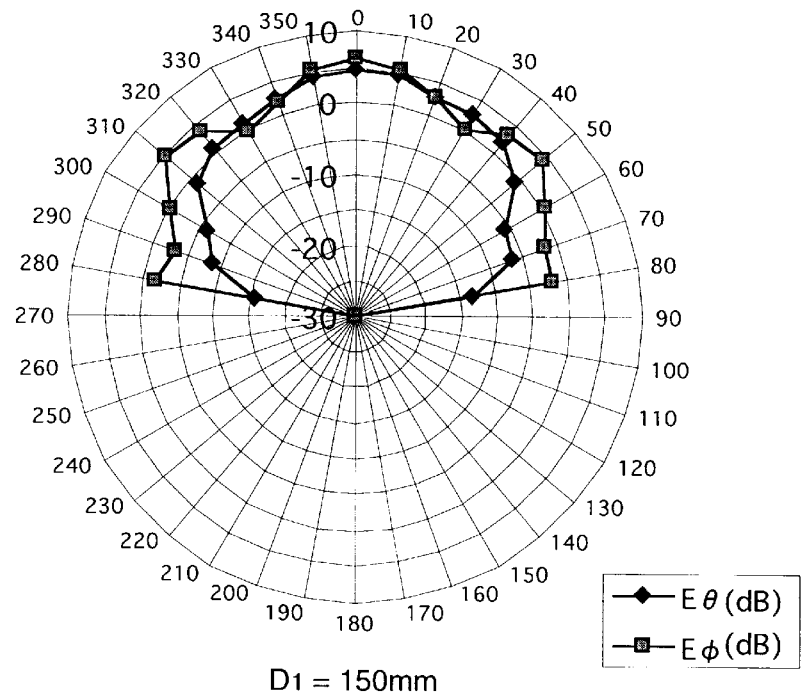
FIG. 4G is a graph showing directivity of the antenna device according to the first embodiment ($D_1$=150 mm)
Figure 4H:
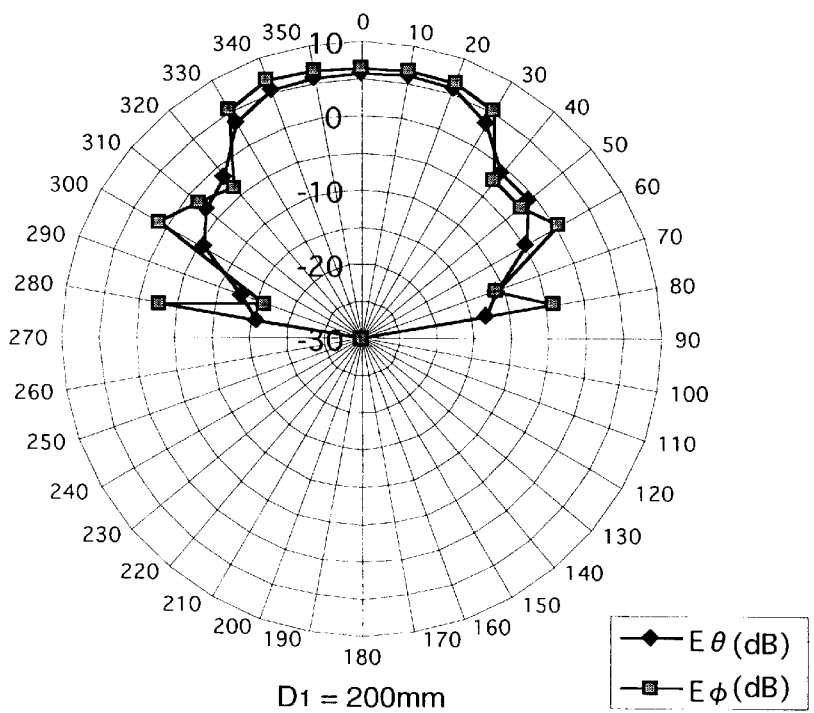
FIG. 4H is a graph showing directivity of the antenna device according to the first embodiment ($D_1$=200 mm)
Figure 4I:
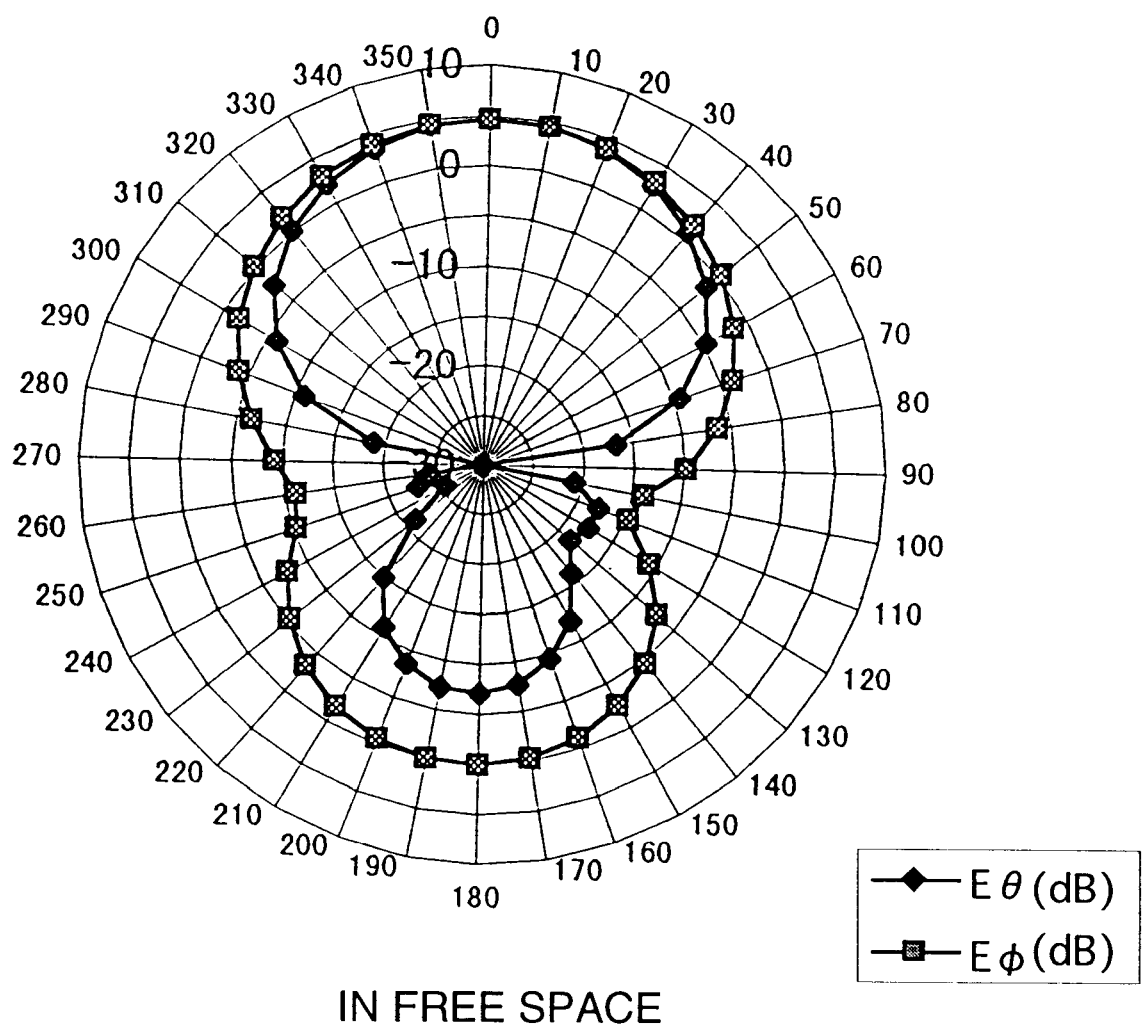
FIG. 4I is a graph showing directivity of the antenna device in free space according to the first embodiment.

FIG. 4I shows directivity of the antenna device, shown in FIGS. 3A, 3B and 3D, in free space. Note, the directivity shown in FIG. 4I is obtained with the distance between the antenna element 20 and the shield plate 30 being set to 15 mm as an example.

Figure 1A:
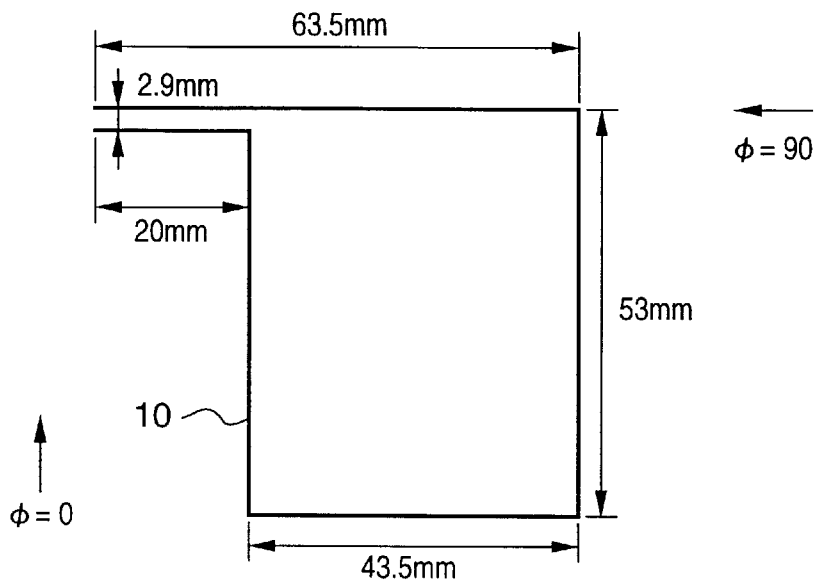
FIG. 1A is a top view showing a shape of a conventional loop antenna element.
Figure 1B:
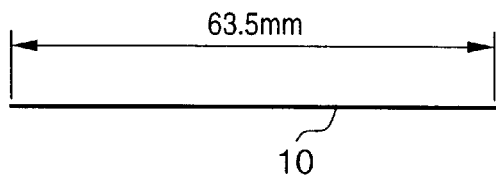
FIG. 1B is a side view showing the shape of the conventional loop antenna element.
Figure 1C:
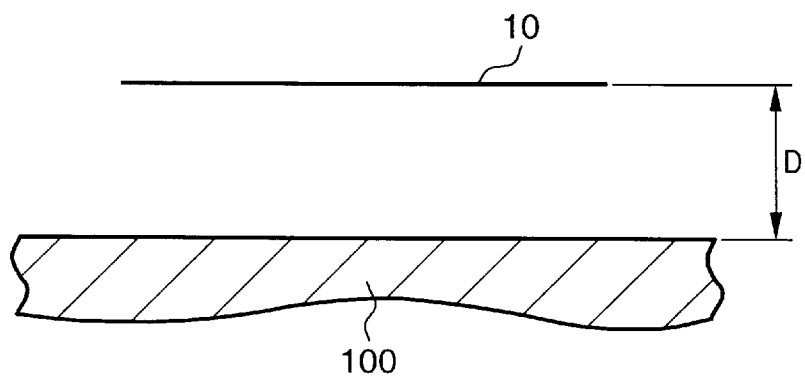
FIG. 1C is a view showing a configuration of an antenna device used in an experiment carried out by the inventors of the present invention.
Figure 1F:
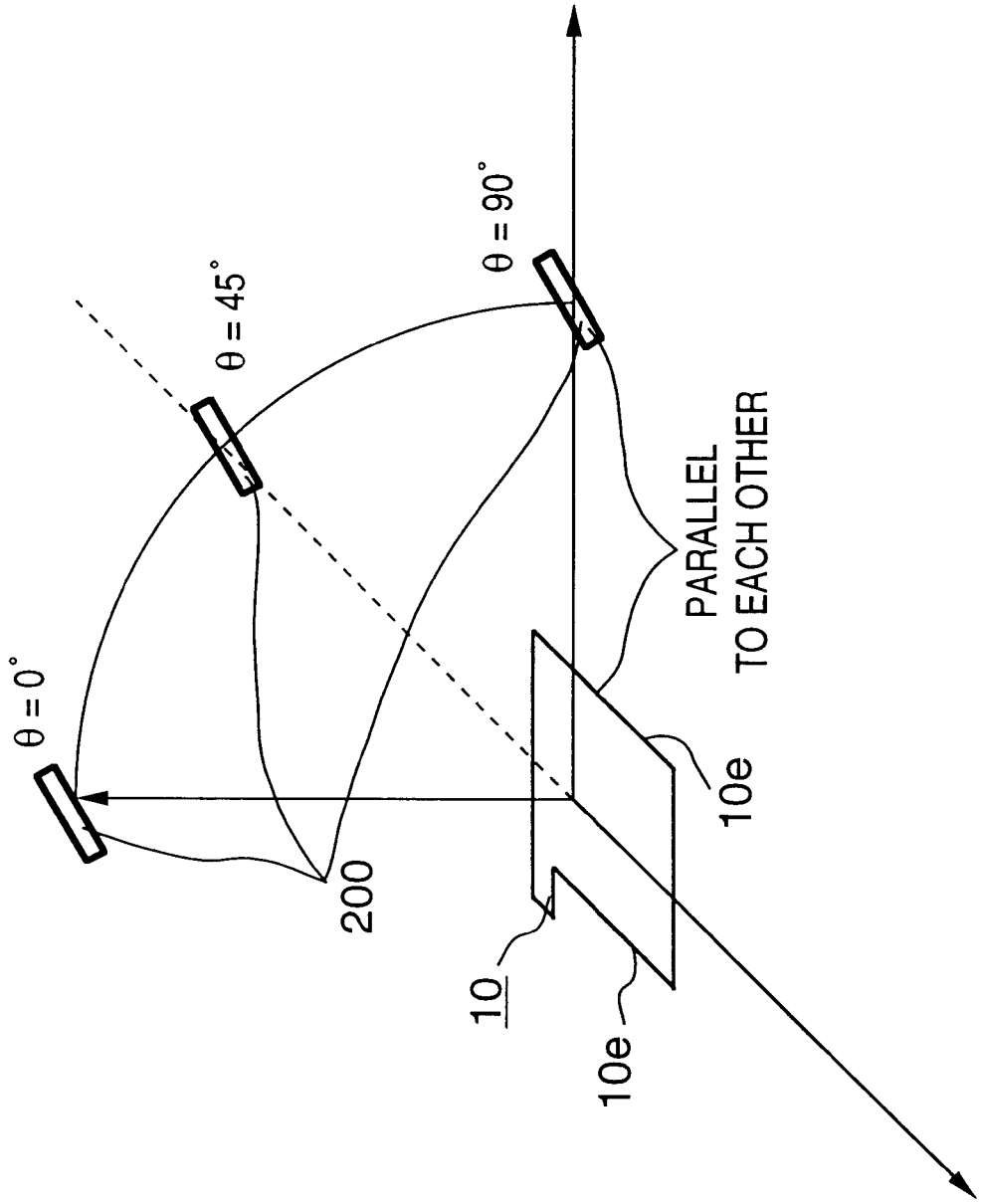
FIG. 1F is a view showing definition of $E_\phi$.
Figure 2A:
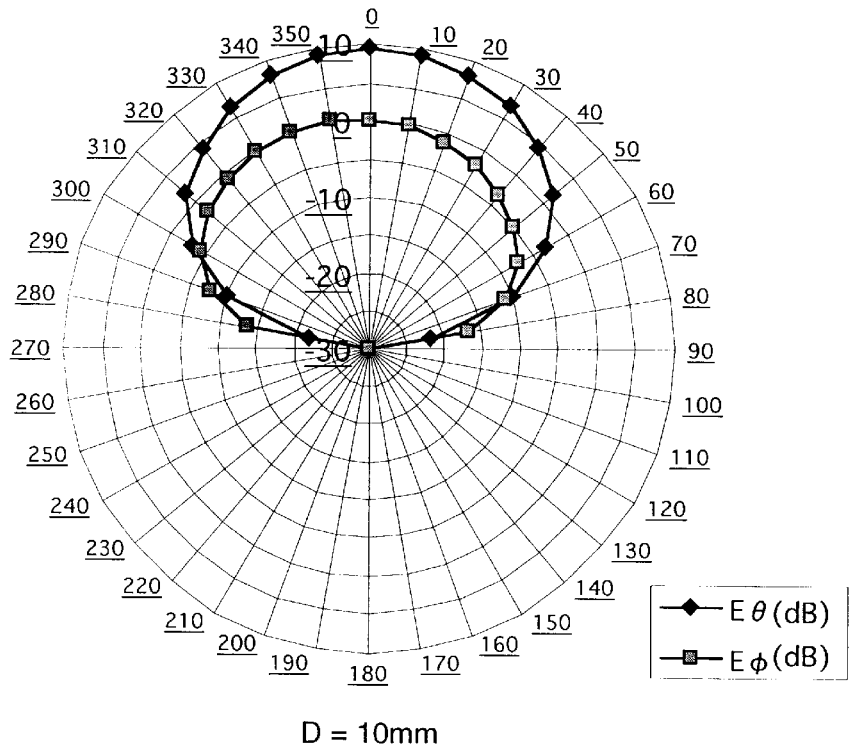
FIG. 2A is a graph showing directivity of a conventional antenna device (D=10 mm)
Figure 2B:
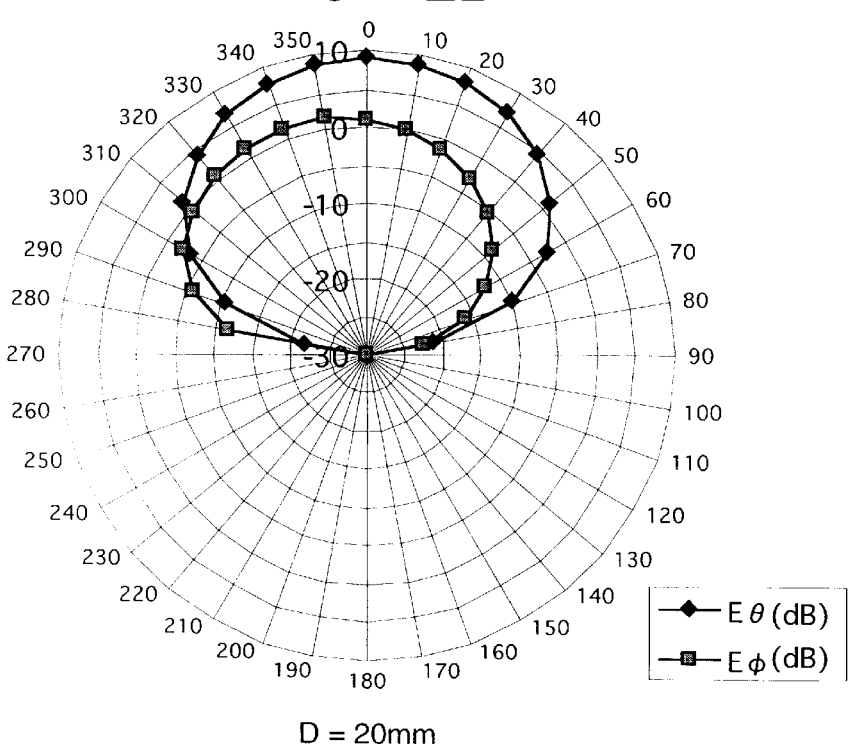
FIG. 2B is a graph showing directivity of the conventional antenna device (D=20 mm)
Figure 2C:
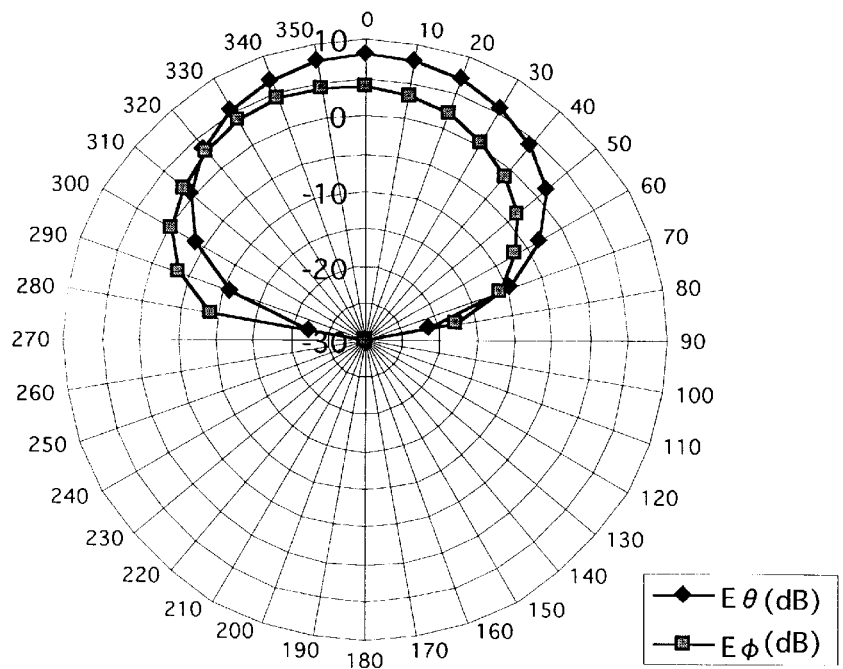
FIG. 2C is a graph showing directivity of the conventional antenna device (D=30 mm)
Figure 2D:
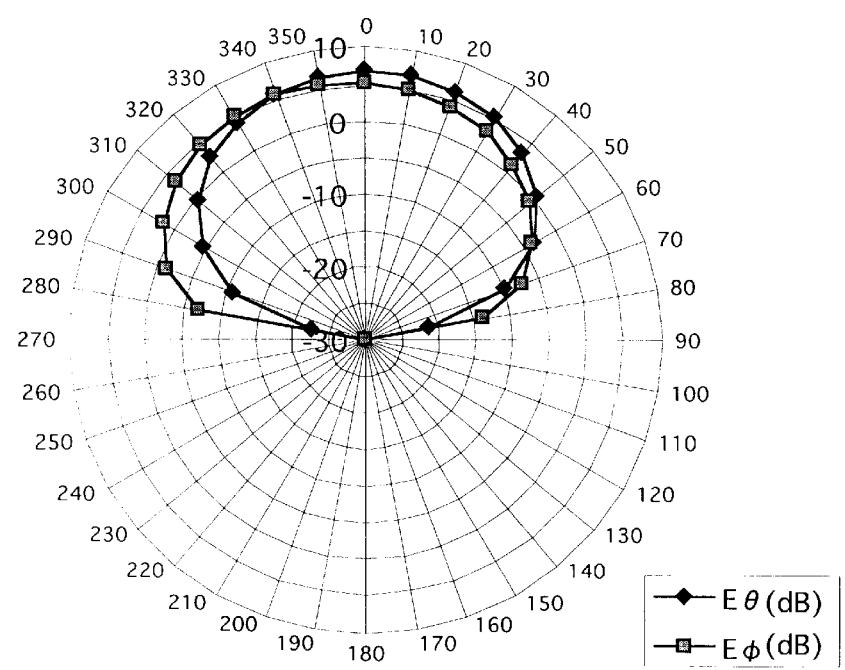
FIG. 2D is a graph showing directivity of the conventional antenna device (D=40 mm)
Figure 2E:
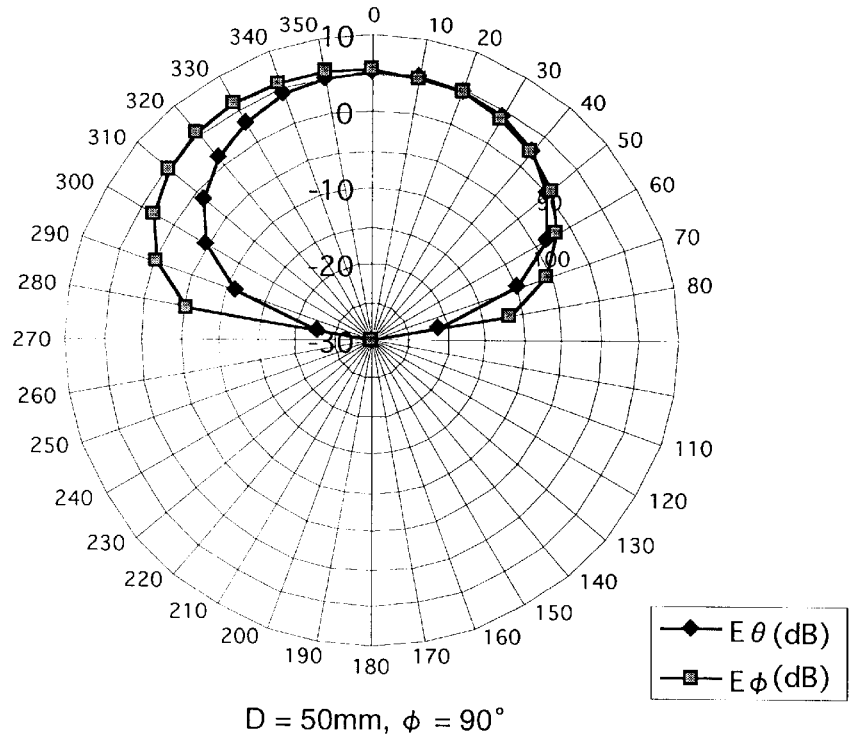
FIG. 2E is a graph showing directivity of the conventional antenna device (D=50 mm)
Figure 2F:
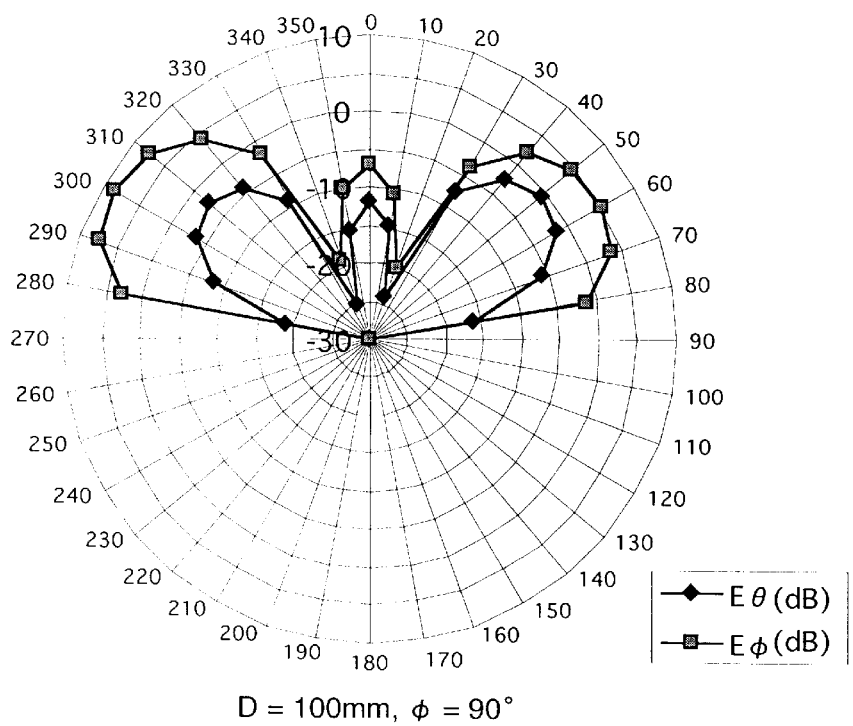
FIG. 2F is a graph showing directivity of the conventional antenna device (D=100 mm)
Figure 2G:
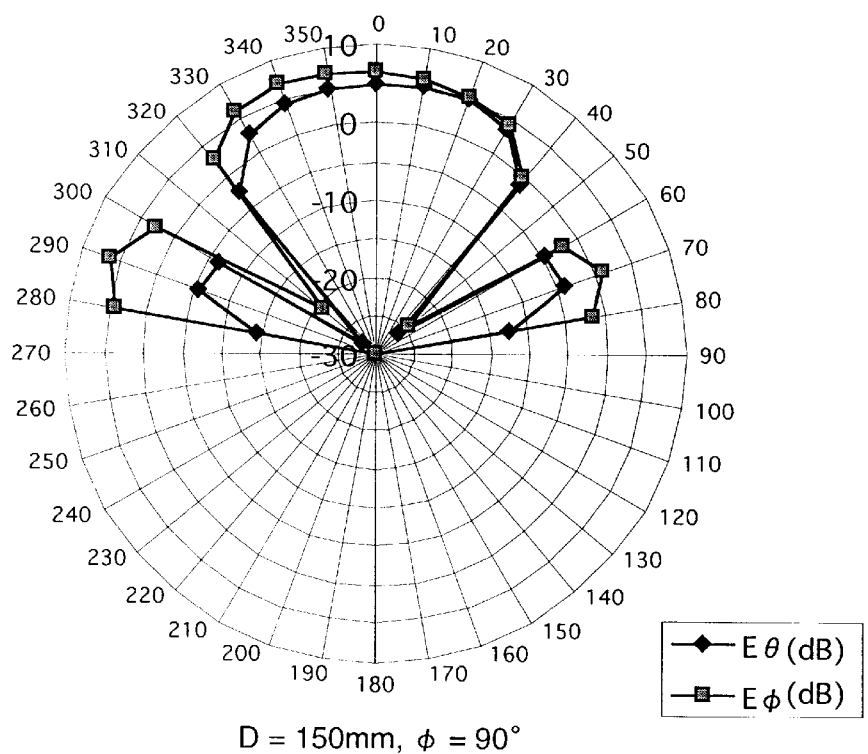
FIG. 2G is a graph showing directivity of the conventional antenna device (D=150 mm)
Figure 2H:
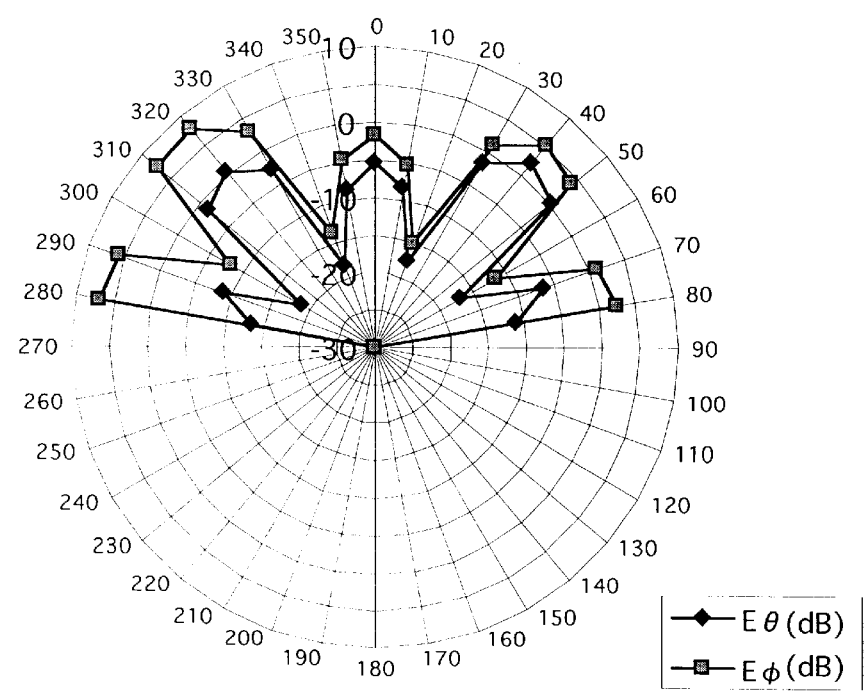
FIG. 2H is a graph showing directivity of the conventional antenna device (D=200 mm)
Figure 2I:
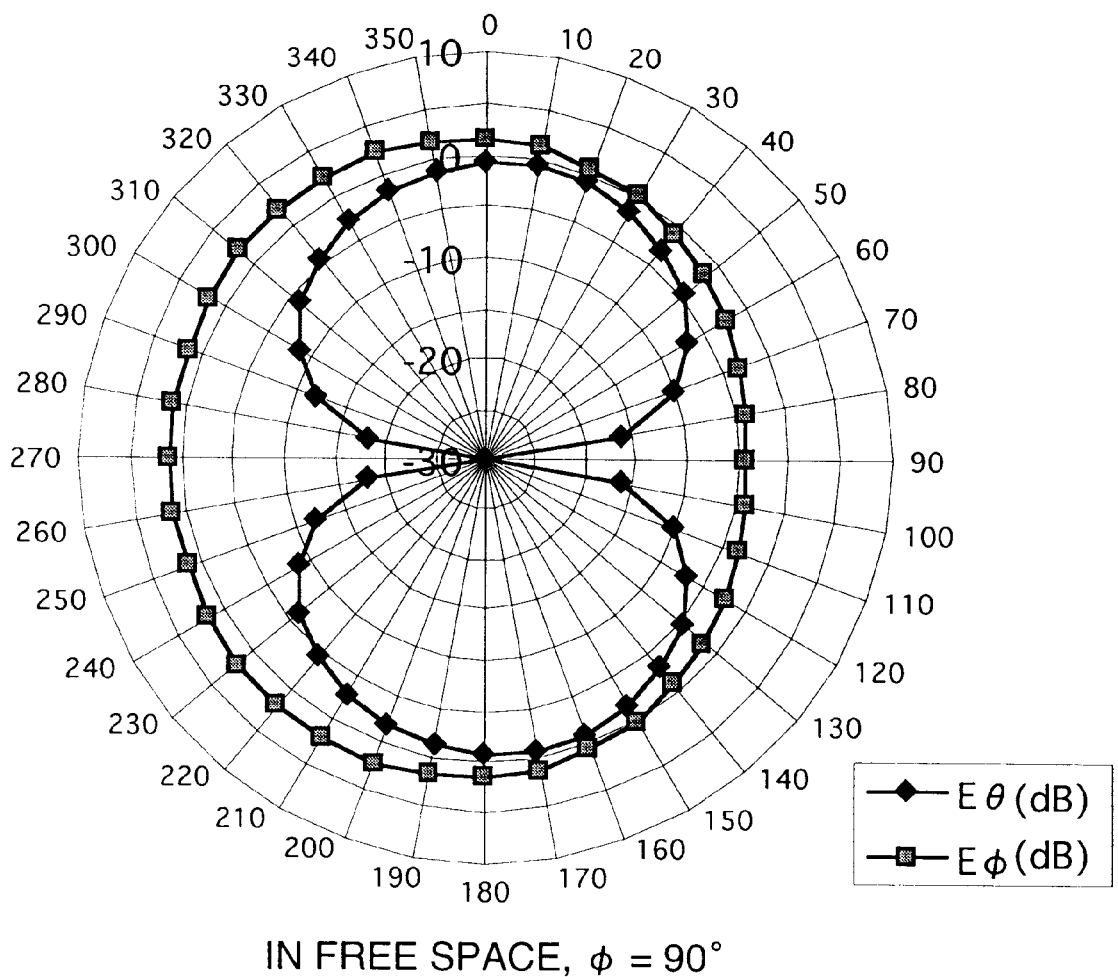
FIG. 2I is a graph showing directivity of the conventional antenna device in free space.

The directivity in free space shown in FIG. 4I bears resemblance to the directivity of the conventional antenna element (i.e., an antenna element without the shield plate 30) in free space (see FIG. 2I).

The antenna device of the present invention is very effective when the metal conductor 100 (the metal conductor is referred to as "vehicle metal conductor" hereinafter, since the antenna in the first embodiment is applied to a vehicle use) exists near the antenna element 20, as shown in FIG. 3C. FIGS. 4A to 4H show directivity of the antenna when the distance between the antenna element 20 and the shield plate 30 is fixed to 15 mm while varying the distance, $D_1$, between the shield plate 30 and the vehicle metal conductor 100.

By comparing the characteristics shown in FIGS. 4A to 4H to the characteristics of the conventional antenna device shown in FIGS. 2A to 2H, it is obvious that the shield plate 30 of the first embodiment has improved by eliminating effects of the vehicle metal conductor 100 on the loop antenna element 20.

Further, the graphs in FIGS. 4A to 4H show that the antenna device of the first embodiment (antenna element 20 is arranged in parallel to the horizontal plane) has high directivity in the vertical direction. This means that the antenna device of the first embodiment is suitable for a GPS antenna.

Figure 5A:
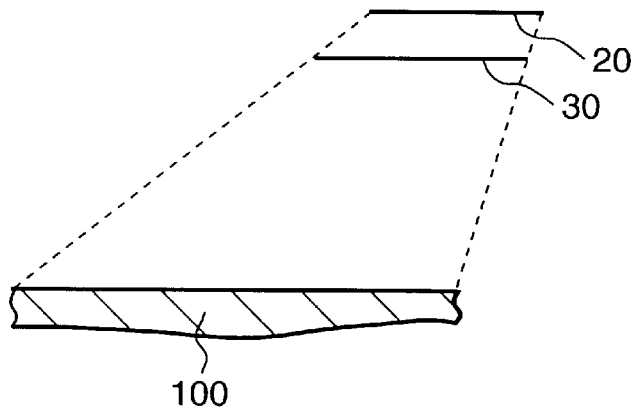
FIG. 5A is an explanatory view for explaining modification of position relationship between an antenna element 20, a shield plate 30, and a conductor 100 of the antenna device according to the first embodiment.
Figure 5B:
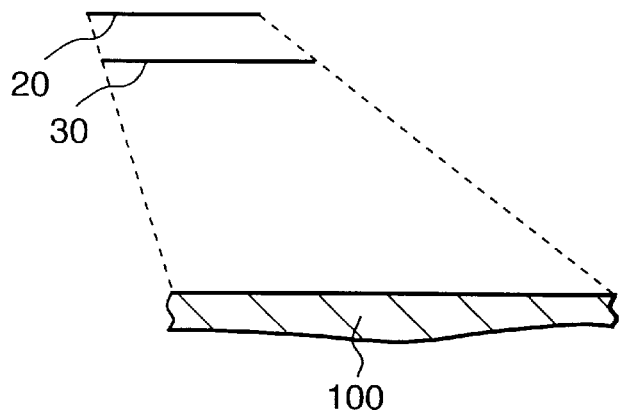
FIG. 5B is an explanatory view for explaining modification of position relationship between the antenna element 20, the shield plate 30, and the conductor 100 of the antenna device according to the first embodiment.

The shield plate 30 is for shielding effects of electromagnetic field of the vehicle metal conductor 100 from the antenna element 20; therefore, the arrangement of the shield plate 30 and the antenna element 20 has to be decided in consideration of the position of the vehicle metal conductor 100. If the vehicle metal conductor 100 may be considered as having a finite area, the shield plate 30 is placed as shown in FIG. 5A or 5B, for instance.

<Distance Relationship Between the Antenna Element And the Shield Plate>

Figure 5C:
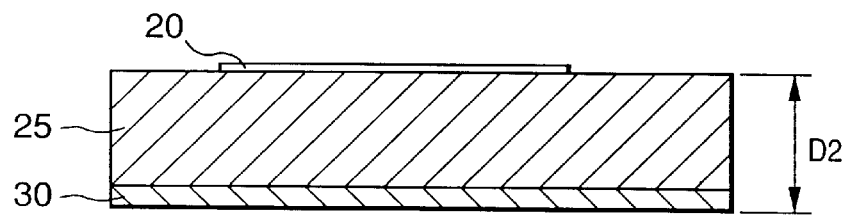
FIG. 5C is a side view of the antenna device when the distance between the antenna element and the shield plate of the antenna device is changed according to the first embodiment.

The inventors of the present invention measured directivity of the antenna device of the first embodiment while changing the distance $D_2$ between the antenna element 20 and the shield plate 30 as shown in FIG. 5C.

Characteristics of directivity obtained while changing the ratio of the distance $D_2$ to wavelength $\lambda$ (=$D_2/\lambda$) are shown in FIGS. 6A to 6L. Note, wavelength ($\lambda$) and a half of the wavelength ($\lambda/2$) corresponding to 1000 MHz, 2000 MHz, 4000 MHz, and 6000 MHz are shown in the following table.

TABLE

|  | $\lambda$ | $\lambda/2$ |
|---|---|---|
| 1000 MHz | 30 cm | 15 cm |
| 2000 MHz | 15 cm | 7.5 cm |
| 4000 MHz | 7.5 cm | 3.75 cm |
| 6000 MHz | 5 cm | 2.5 cm |

Figure 6A:
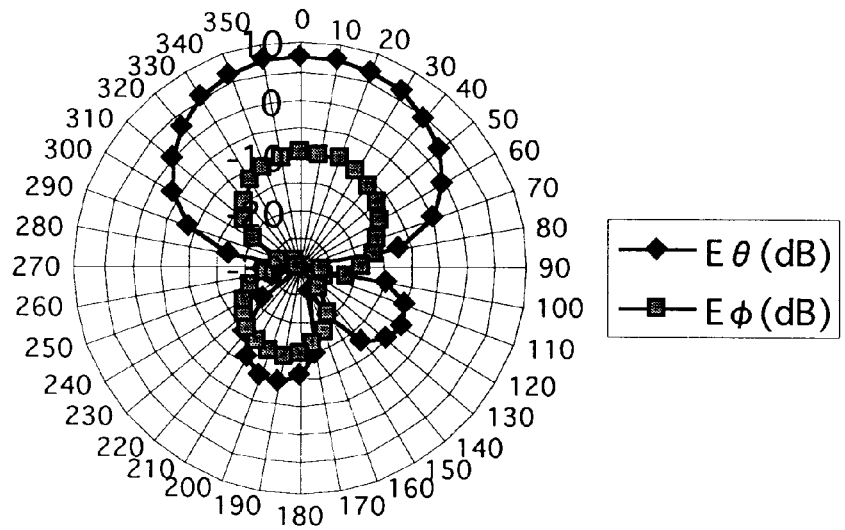
FIG. 6A is a graph showing directivity of the antenna device according to the first embodiment when the distance ($D_2/\lambda$) between the antenna element and the shield plate is set to 0.03.
Figure 6B:
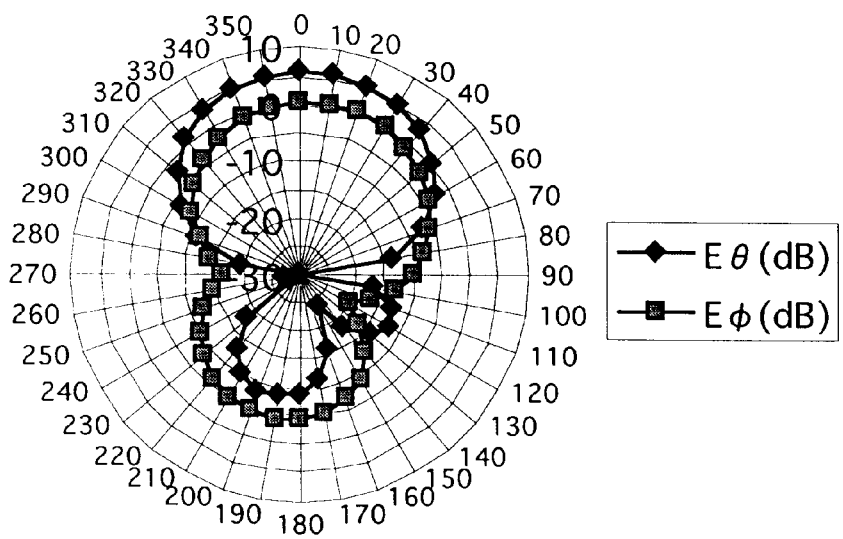
FIG. 6B is a graph showing directivity of the antenna device according to the first embodiment when the distance ($D_2/\lambda$) between the antenna element and the shield plate is set to 0.04.
Figure 6C:
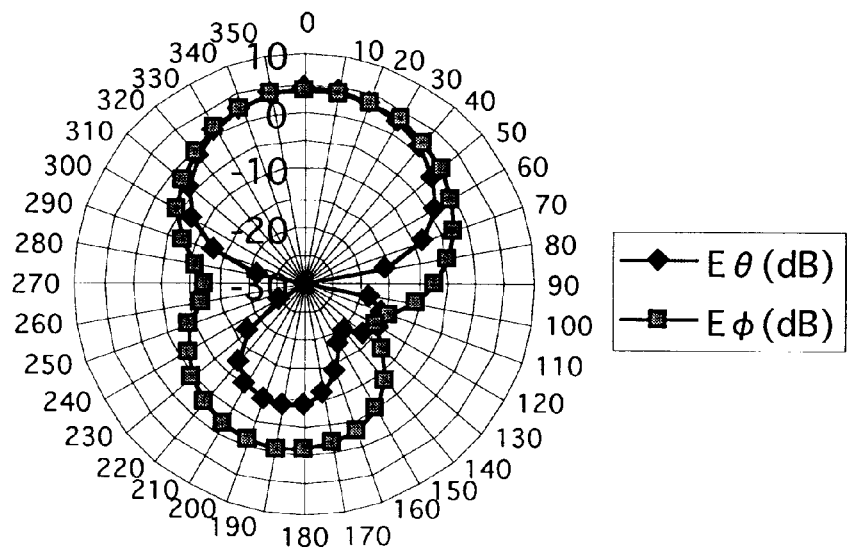
FIG. 6C is a graph showing directivity of the antenna device according to the first embodiment when the distance ($D_2/\lambda$) between the antenna element and the shield plate is set to 0.05.
Figure 6D:
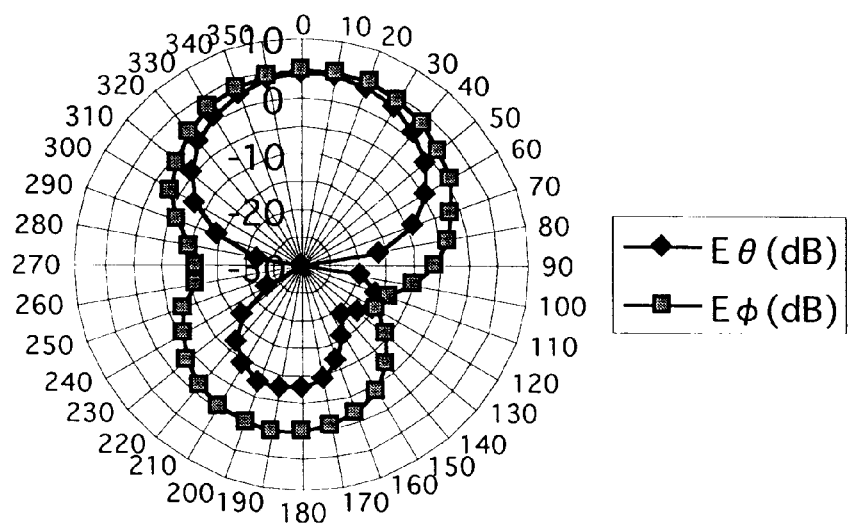
FIG. 6D is a graph showing directivity of the antenna device according to the first embodiment when the distance ($D_2/\lambda$) between the antenna element and the shield plate is set to 0.06.
Figure 6E:
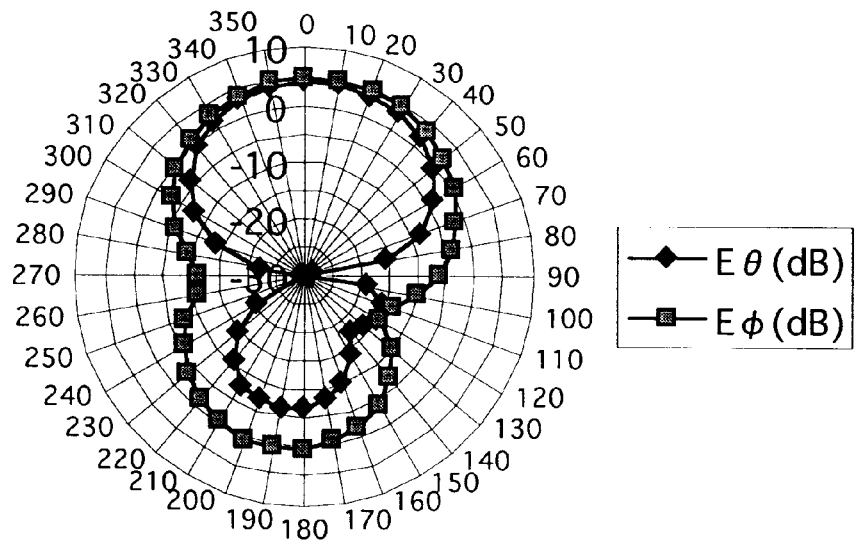
FIG. 6E is a graph showing directivity of the antenna device according to the first embodiment when the distance ($D_2/\lambda$) between the antenna element and the shield plate is set to 0.07.
Figure 6F:
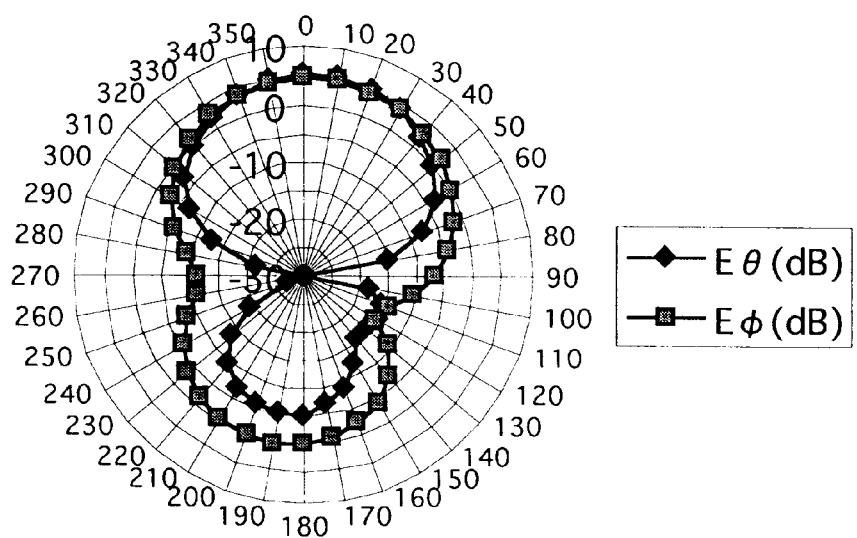
FIG. 6F is a graph showing directivity of the antenna device according to the first embodiment when the distance ($D_2/\lambda$) between the antenna element and the shield plate is set to 0.08.
Figure 6G:
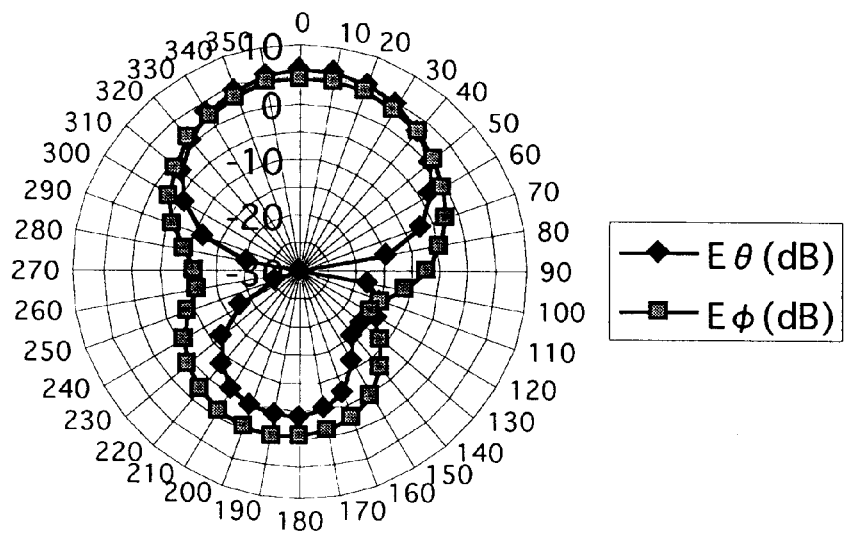
FIG. 6G is a graph showing directivity of the antenna device according to the first embodiment when the distance ($D_2/\lambda$) between the antenna element and the shield plate is set to 0.09.
Figure 6H:
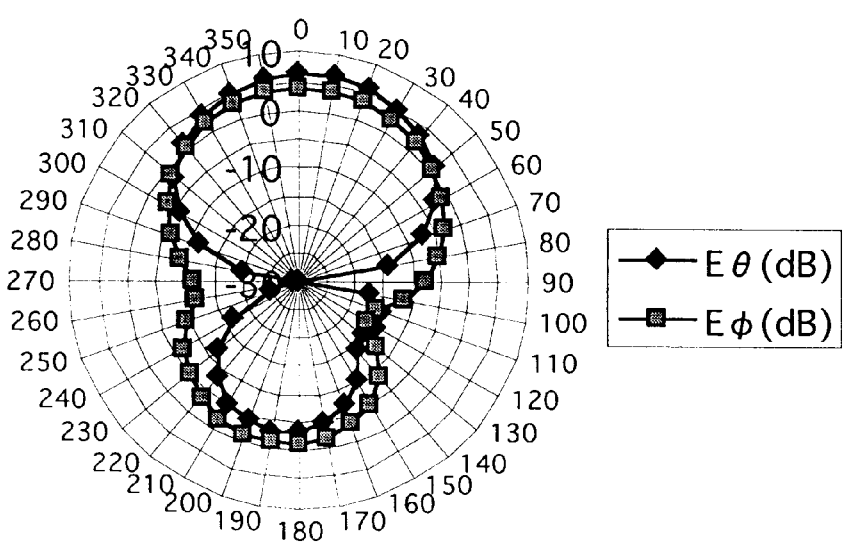
FIG. 6H is a graph showing directivity of the antenna device according to the first embodiment when the distance ($D_2/\lambda$) between the antenna element and the shield plate is set to 0.1.
Figure 6I:
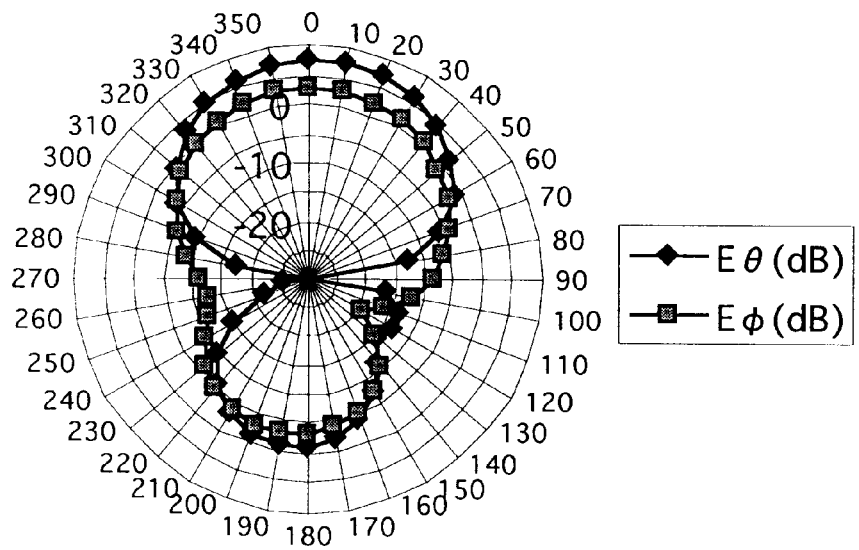
FIG. 6I is a graph showing directivity of the antenna device according to the first embodiment when the distance ($D_2/\lambda$) between the antenna element and the shield plate is set to 0.15.
Figure 6J:
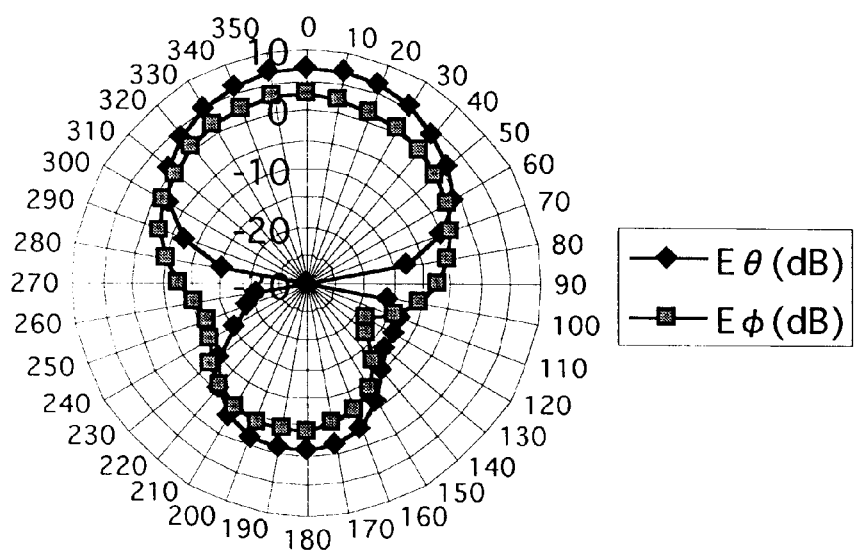
FIG. 6J is a graph showing directivity of the antenna device according to the first embodiment when the distance ($D_2/\lambda$) between the antenna element and the shield plate is set to 0.25.
Figure 6K:
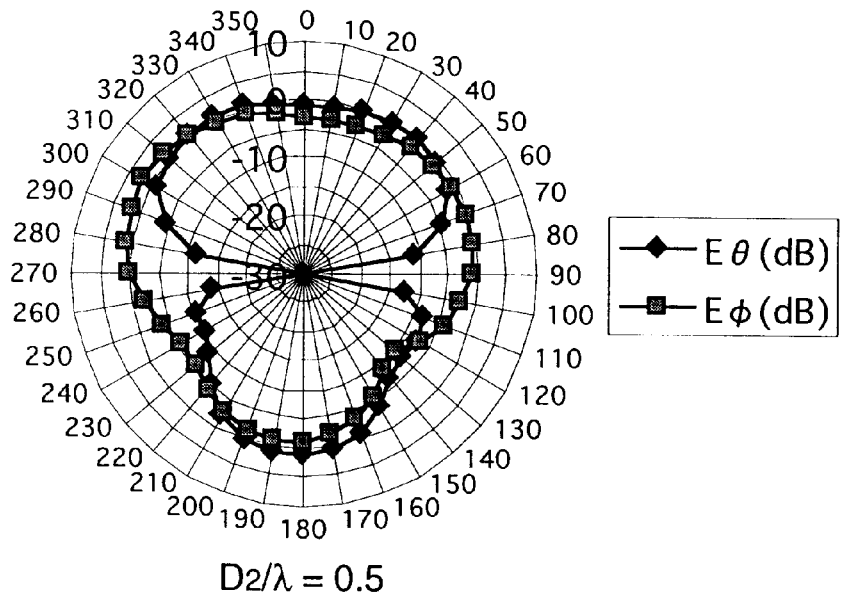
FIG. 6K is a graph showing directivity of the antenna device according to the first embodiment when the distance ($D_2/\lambda$) between the antenna element and the shield plate is set to 0.5.
Figure 6L:
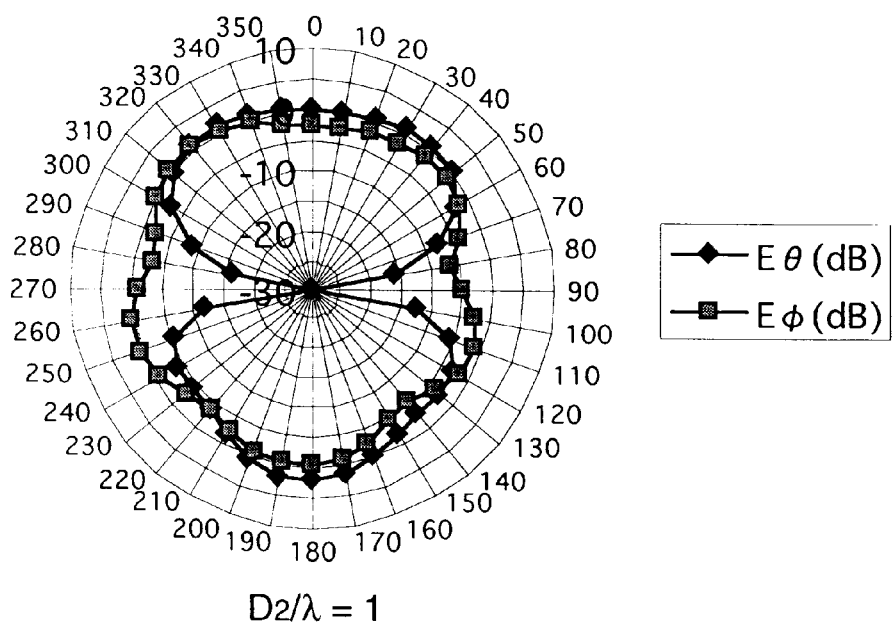
FIG. 6L is a graph showing directivity of the antenna device according to the first embodiment when the distance ($D_2/\lambda$) between the antenna element and the shield plate is set to 1.0.

By considering the directivity shown in FIGS. 6A ($D_2/\lambda$=0.03) and 6H ($D_2/\lambda$=1), it is known that preferred characteristics can not be always obtained when the distance $D_2$ is set to a value which makes $D_2/\lambda$ equal or less than 0.03 ($D_2/\lambda \leq 0.03$) or equal or greater than 1 ($D_2/\lambda \geq 1$). Therefore, when the characteristics shown in FIGS. 6B to 6K are desired, then the distance $D_2$ should be set between $\lambda/25$ and $\lambda/2$.

<Effects of the Size of the Shield Plate>

The inventors of the present invention measured directivity of the antenna device of the first embodiment while changing the size of the shield plate.

Figure 7A:
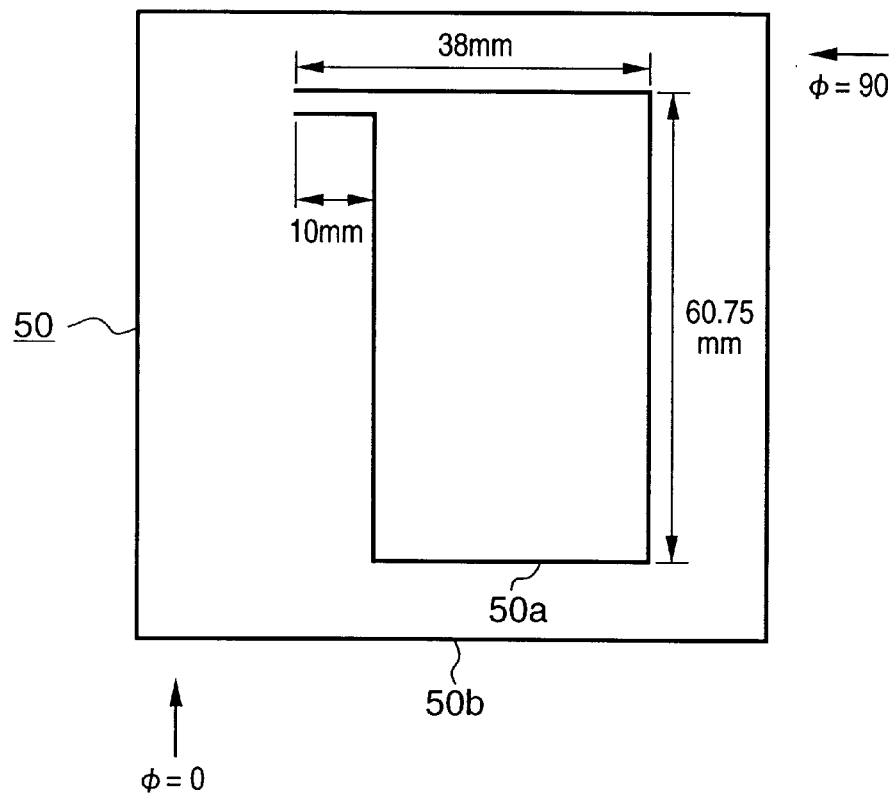
FIG. 7A is a top view showing a shape of an antenna device 50 when the distance between the antenna element and the shield plate is set to 30 mm according to the first embodiment.
Figure 7B:
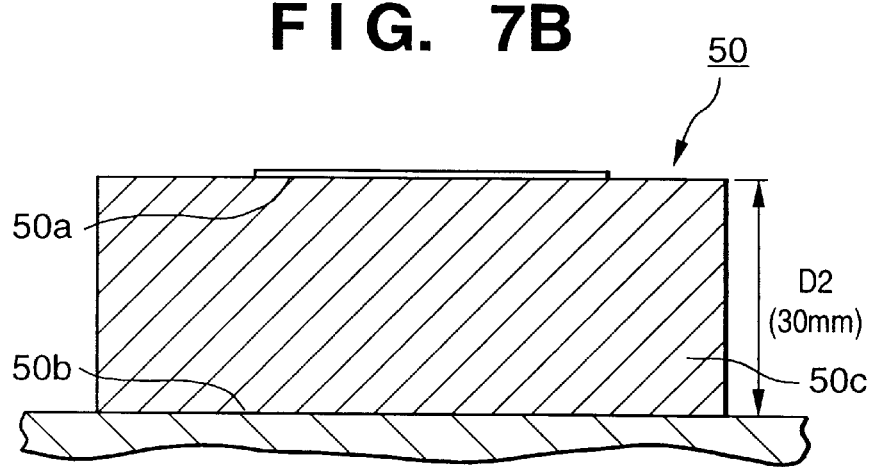
FIG. 7B is a side view showing the shape of the antenna device 50 when the distance between the antenna element and the shield plate is set to 30 mm according to the first embodiment.

FIGS. 7A and 7B show a configuration of an antenna device 50 used in the measurement. The antenna device 50 comprises an antenna element 50a, which corresponds to the antenna element 20 of FIGS. 3A and 3B, a shield plate 50b, which corresponds to the shield plate 30, and a supporting member 50c, which corresponds to the member 25. The antenna element 50a is set to 60.75 mm in length and 38 mm in width. During the measurement after changing the size of the shield plate 50b, the distance $D_2$ between the antenna element 50a and the shield plate 50b is set to 30 mm.

FIGS. 8A to 8H are graphs showing characteristics of the antenna device 50, when a wavelength of a radio wave to be received, f, is 1575.42 MHz and $\phi$ is 90 degrees, obtained after changing the size of the conductor shield plate 50b (the size is referred to as "GP" hereinafter) to infinite, 100 mm×100 mm, 90 mm×90 mm, 80 mm×80 mm, 70 mm×70 mm, 60 mm×60 mm, 50 mm×50 mm, and 40 mm×40 mm, respectively.

Figure 8A:
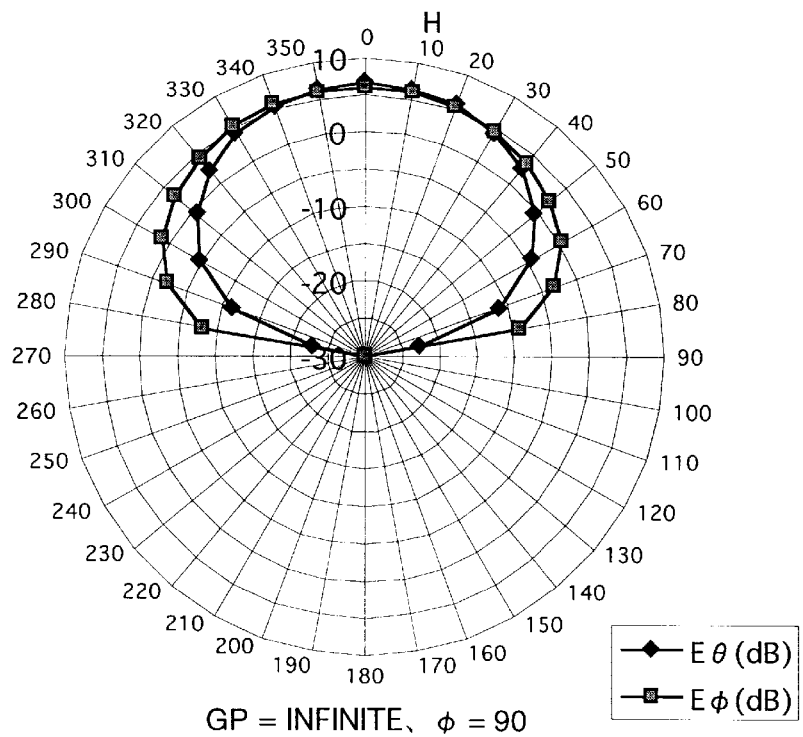
FIG. 8A is a graph showing directivity of the antenna device shown in FIG. 7A when the shield plate of an infinite size is used.
Figure 8B:
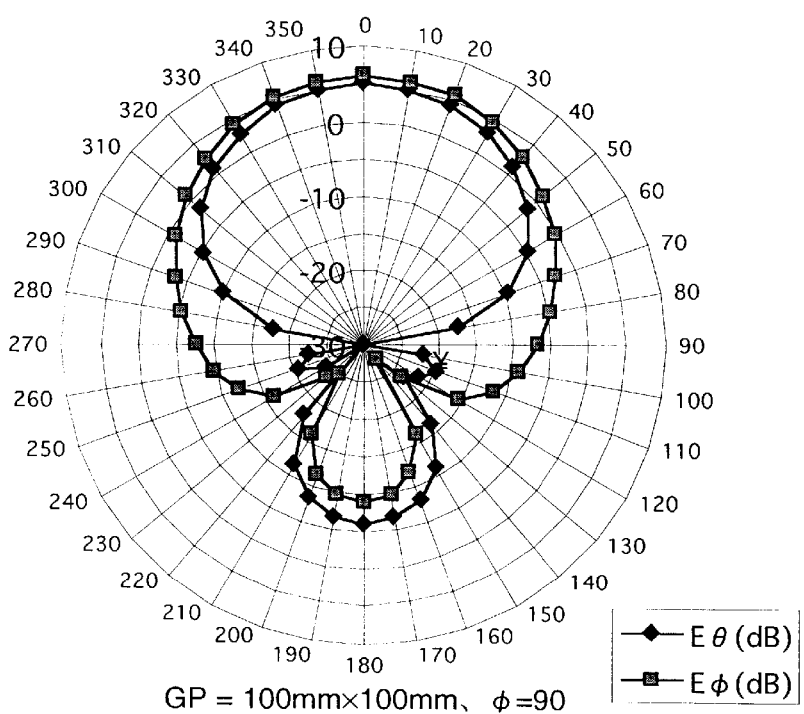
FIG. 8B is a graph showing directivity of the antenna device shown in FIG. 7A when the shield plate of 100 mm×100 mm is used.
Figure 8C:
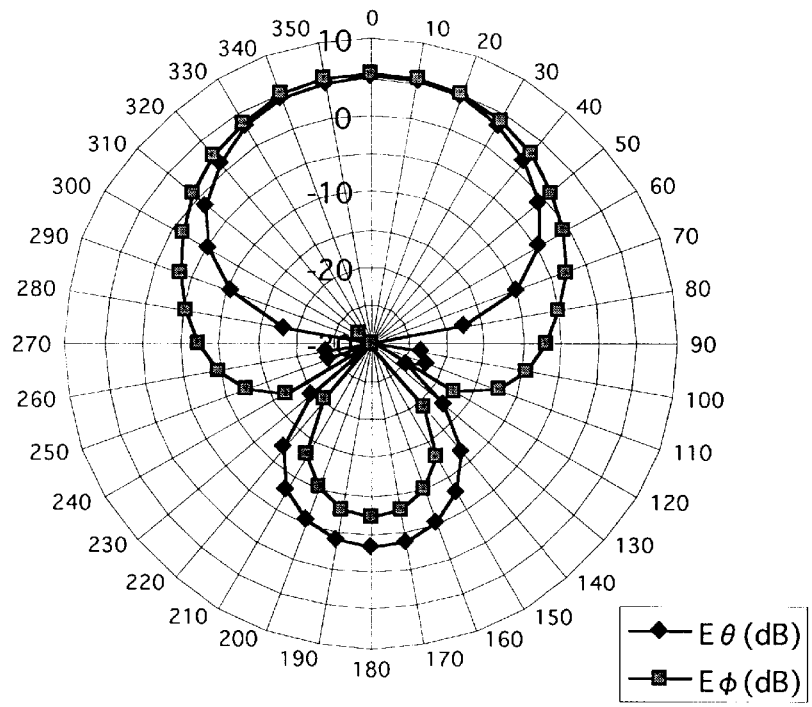
FIG. 8C is a graph showing directivity of the antenna device shown in FIG. 7A when the shield plate of 90 mm×90 mm is used.
Figure 8D:
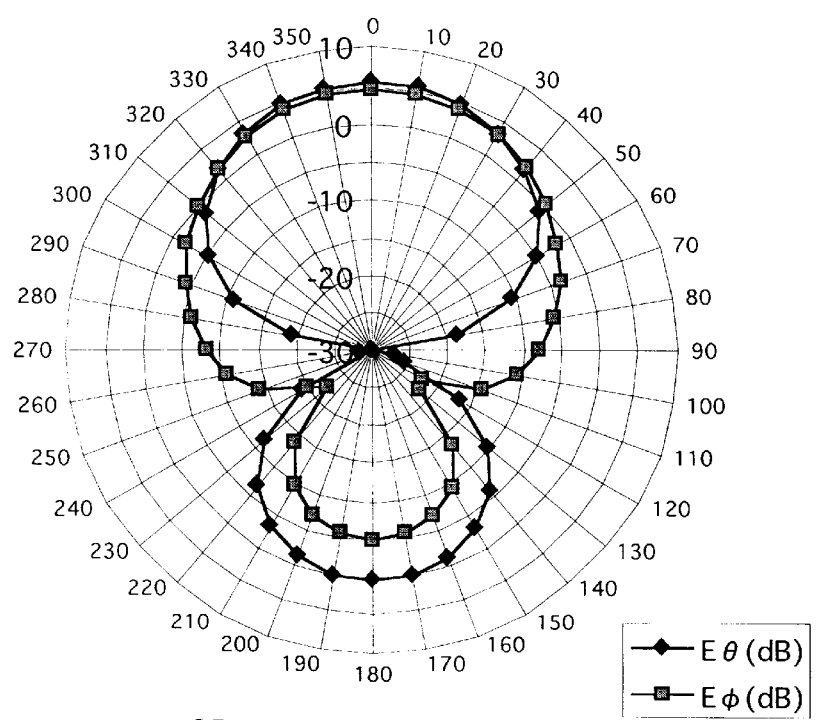
FIG. 8D is a graph showing directivity of the antenna device shown in FIG. 7A when the shield plate of 80 mm×80 mm is used.
Figure 8E:
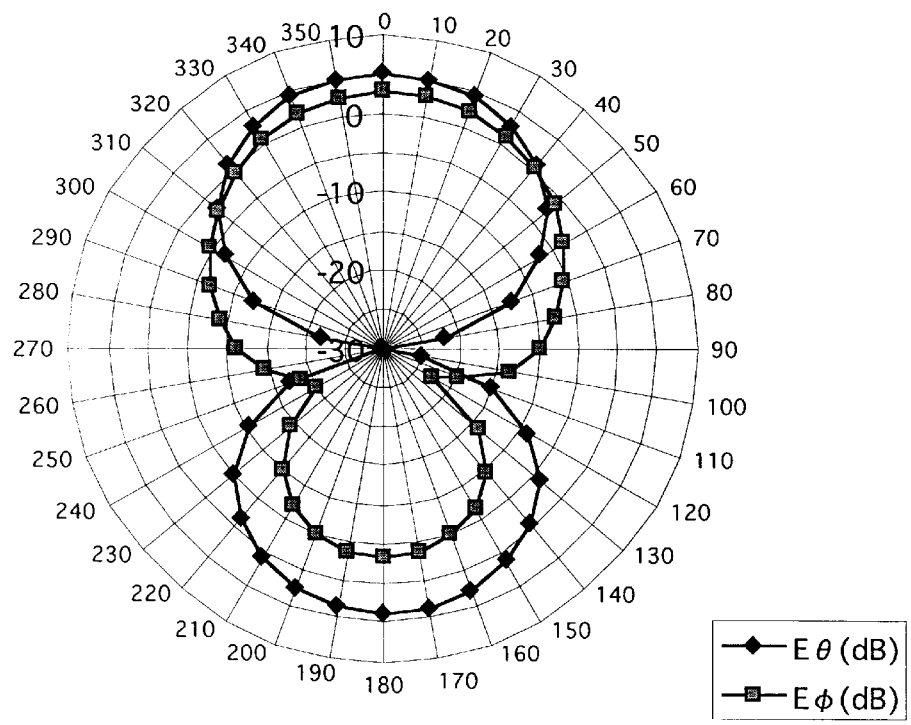
FIG. 8E is a graph showing directivity of the antenna device shown in FIG. 7A when the shield plate of 70 mm×70 mm is used.
Figure 8F:
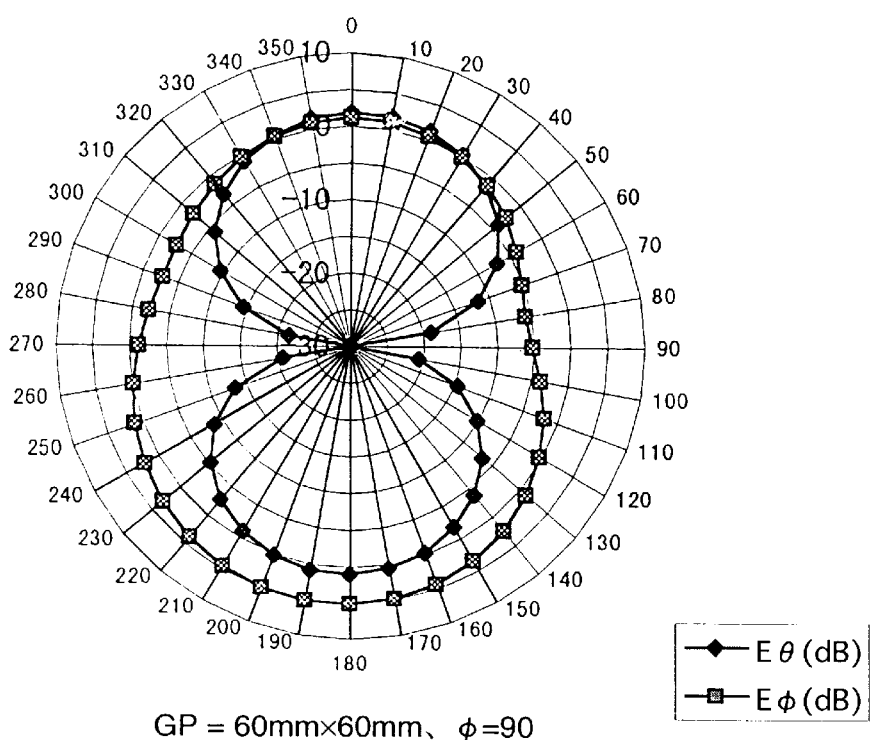
FIG. 8F is a graph showing directivity of the antenna device shown in FIG. 7A when the shield plate of 60 mm×60 mm is used.
Figure 8G:
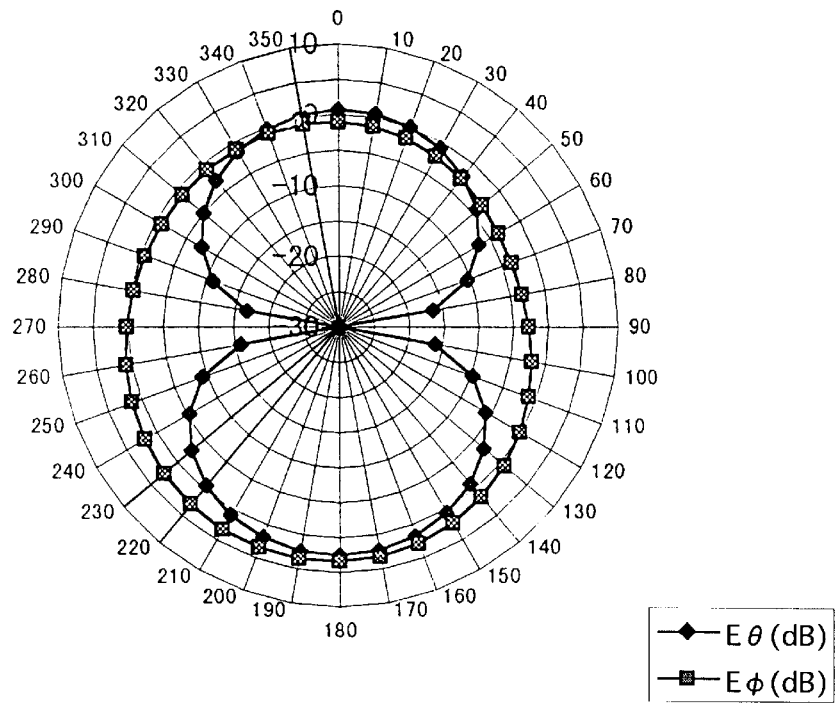
FIG. 8G is a graph showing directivity of the antenna device shown in FIG. 7A when the shield plate of 50 mm×50 mm is used.
Figure 8H:
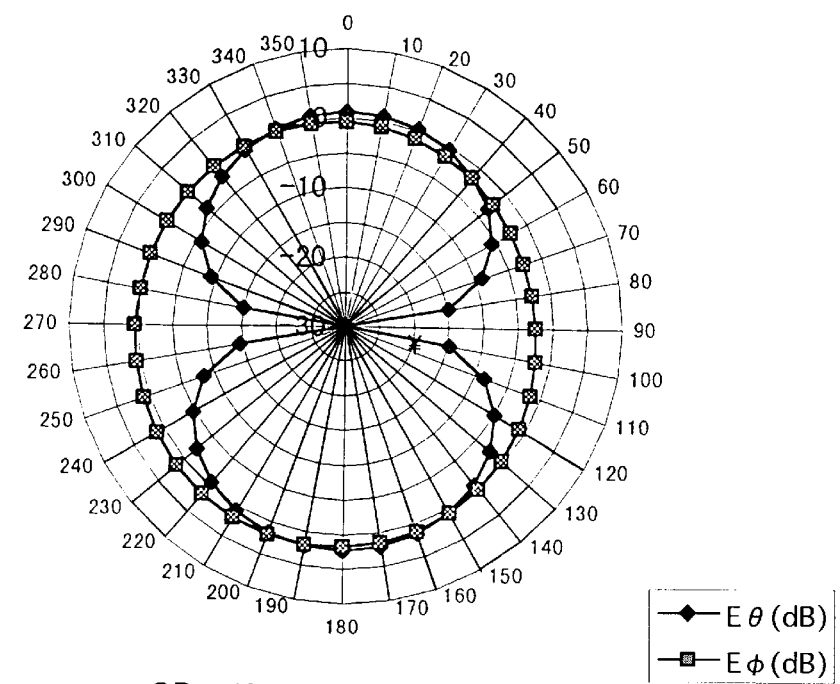
FIG. 8H is a graph showing directivity of the antenna device shown in FIG. 7A when the shield plate of 40 mm×40 mm is used.

In analysis of the measured results as shown in FIGS. 8A to 8H, it is known that, when the GP is set equal or less than 60 mm×60 mm, sensitivity is improved in a lower area (between 90 and 270 degrees in the graphs) in FIGS. 8F, 8G and 8H. Therefore, when the antenna device is applied to a GPS antenna, the GP of the shield plate 50b having a size equal or less than 60 mm×60 mm does not provide expected effect. In addition, since good directivity characteristics are shown in FIGS. 8A to 8E, it is found that effect of the shield plate 50b is assured if the shield plate 50b has the GP of approximately not lager than 70 mm×70 mm (i.e., GP=$3\lambda/8$ as shown in FIG. 8E).

Note, the effect of the shield plate is virtually proportional to the area of the shield plate, therefore, the length of one side of the shield plate may be set to other than $3\lambda/8$ as long as the area is equal or less than $9\lambda^2/64$ (=$\{3\lambda/8\}^2$).

Figure 9A:
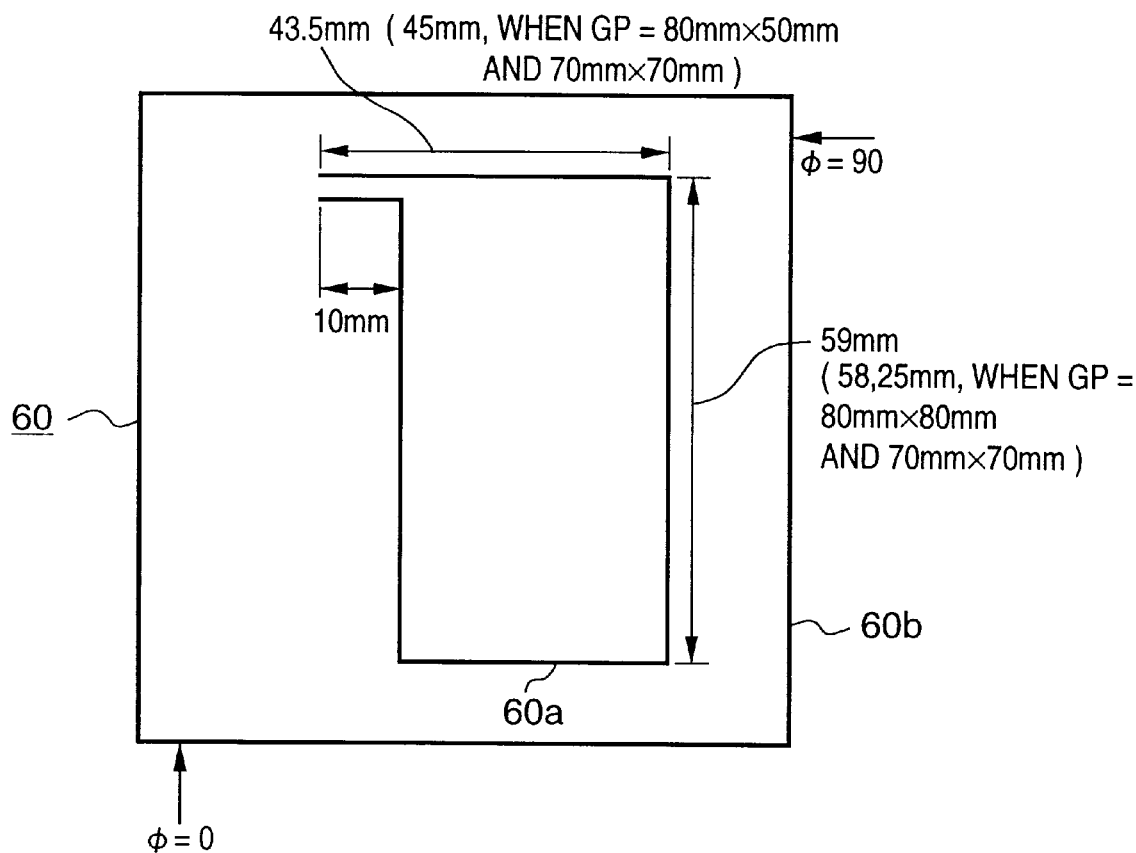
FIG. 9A is a top view showing a shape of an antenna device 60 when the distance between the antenna element and the shield plate is set to 15 mm according to the first embodiment.
Figure 9B:
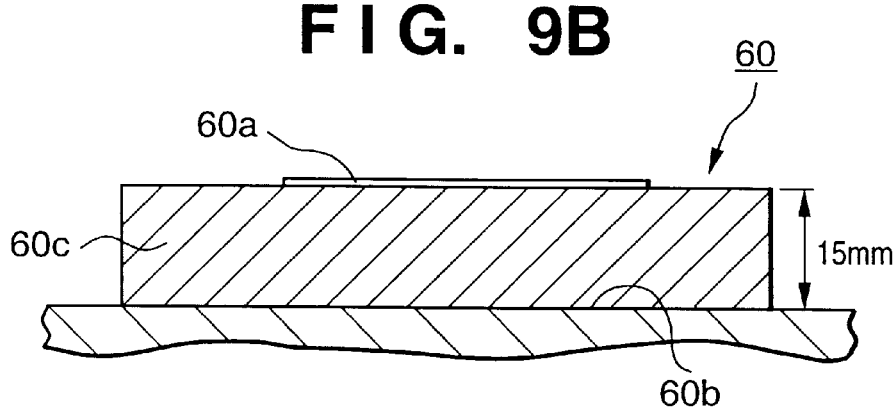
FIG. 9B is a top view showing the shape of the antenna device 60 when the distance between the antenna element and the shield plate is set to 15 mm according to the first embodiment.
Figure 10A:
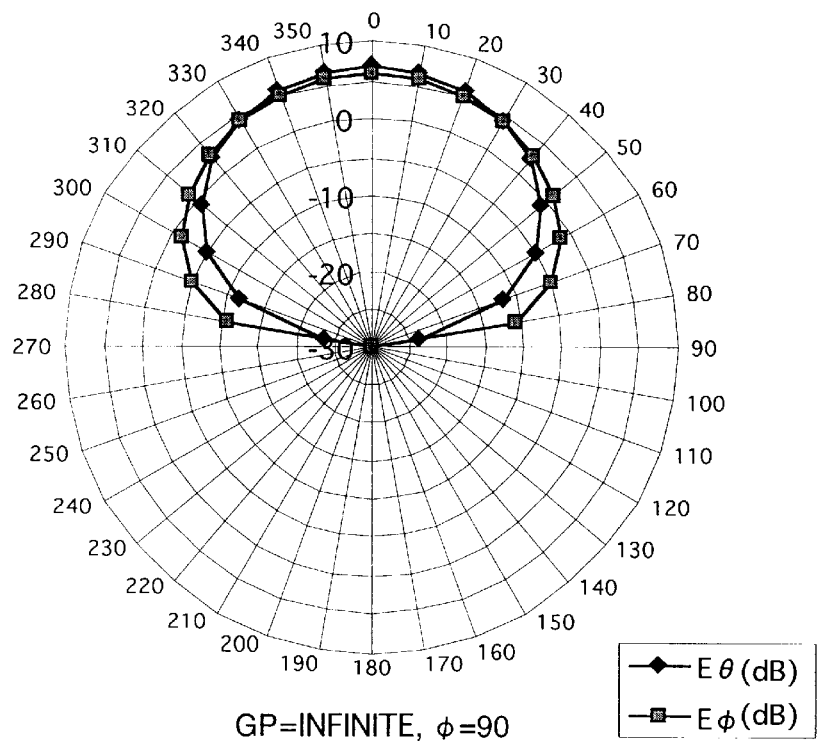
FIG. 10A is a graph showing directivity of the antenna device shown in FIG. 9A when the shield plate of an infinite size is used.
Figure 10B:
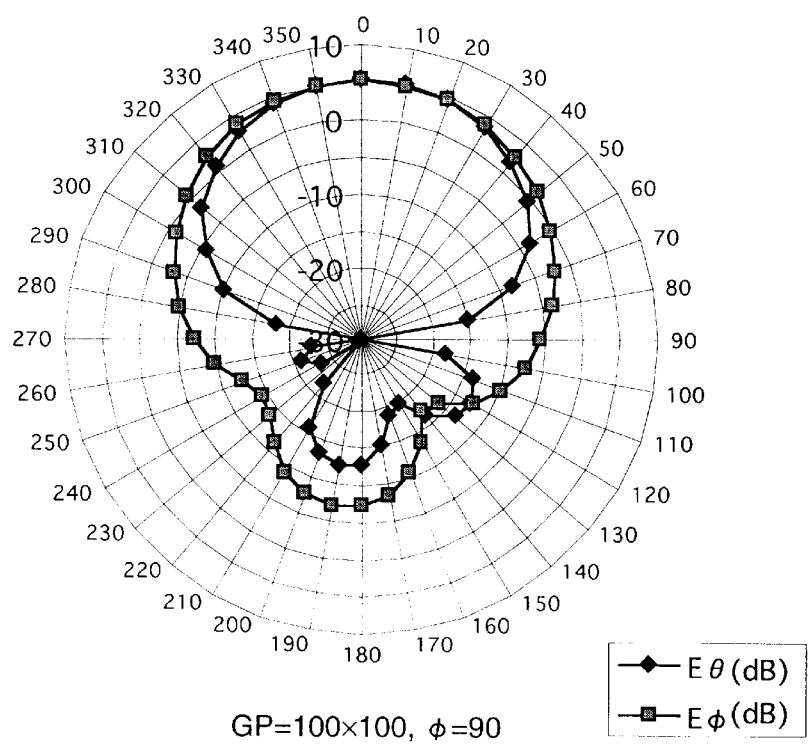
FIG. 10B is a graph showing directivity of the antenna device shown in FIG. 9A when the shield plate of 100 mm×100 mm is used.
Figure 10C:
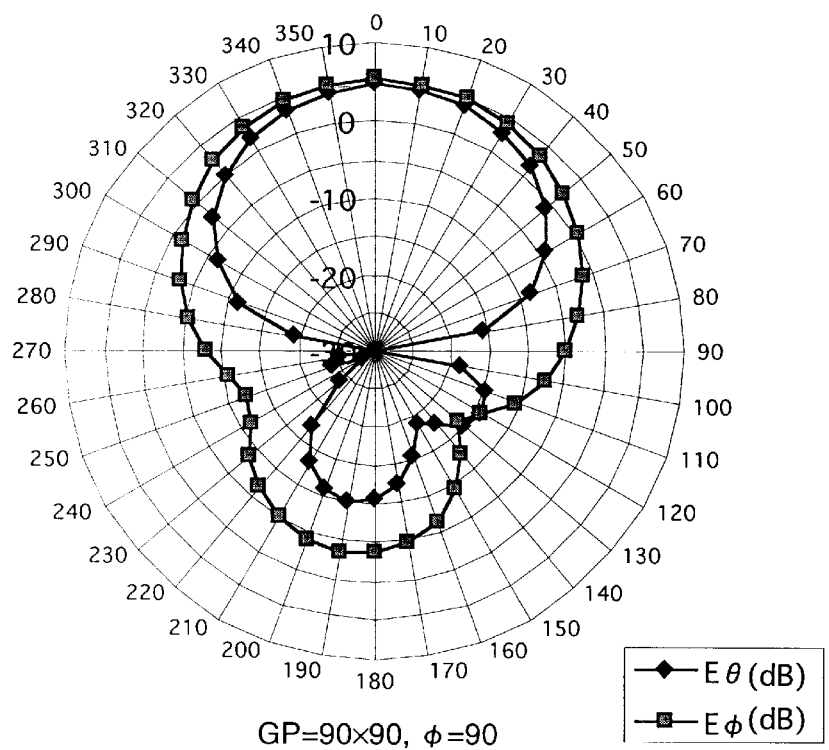
FIG. 10C is a graph showing directivity of the antenna device shown in FIG. 9A when the shield plate of 90 mm×90 mm is used.
Figure 10D:
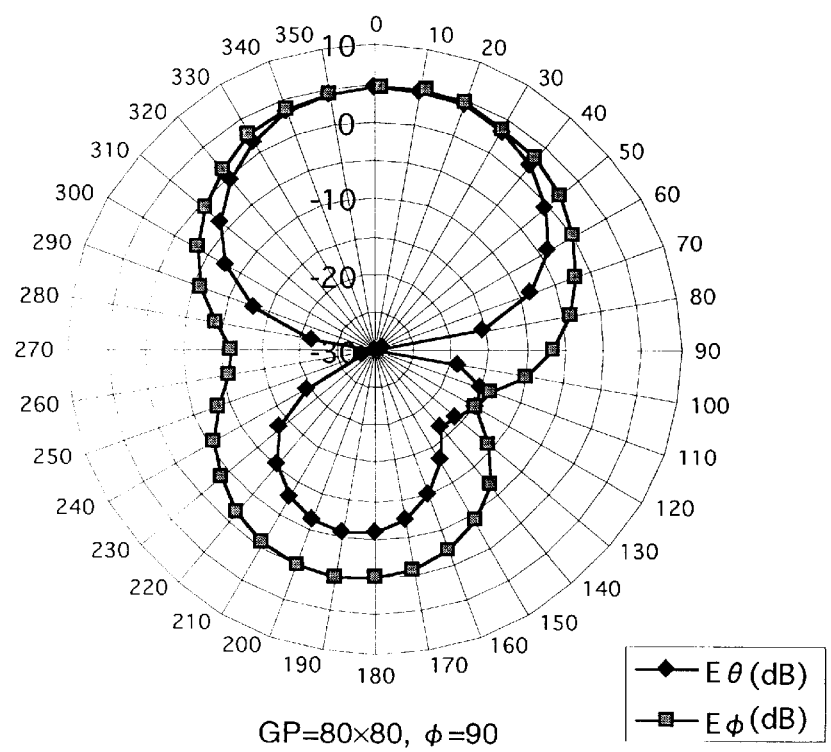
FIG. 10D is a graph showing directivity of the antenna device shown in FIG. 9A when the shield plate of 80 mm×80 mm is used.
Figure 10E:
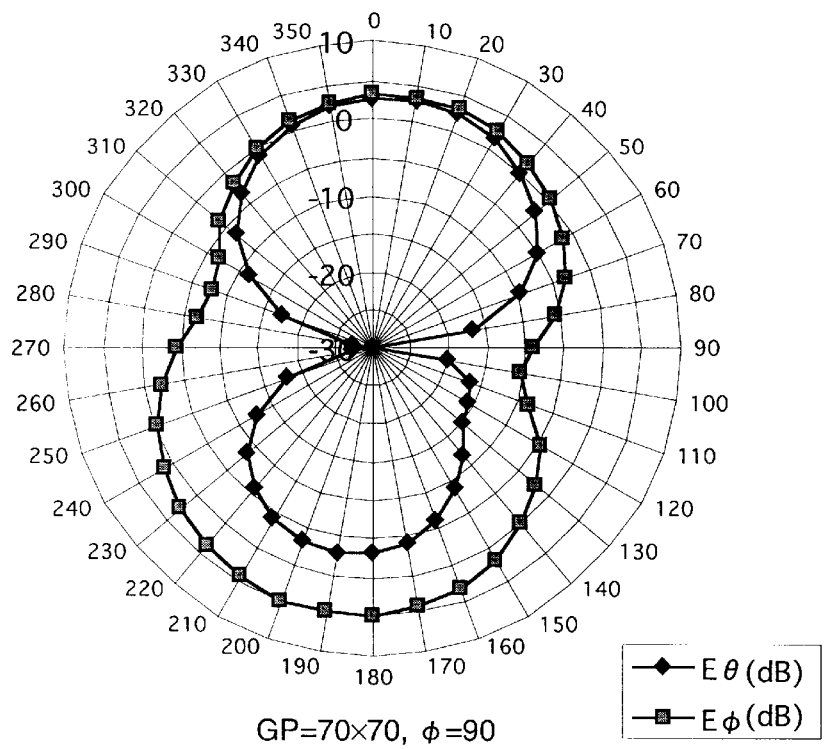
FIG. 10E is a graph showing directivity of the antenna device shown in FIG. 9A when the shield plate of 70 mm×70 mm is used.
Figure 10F:
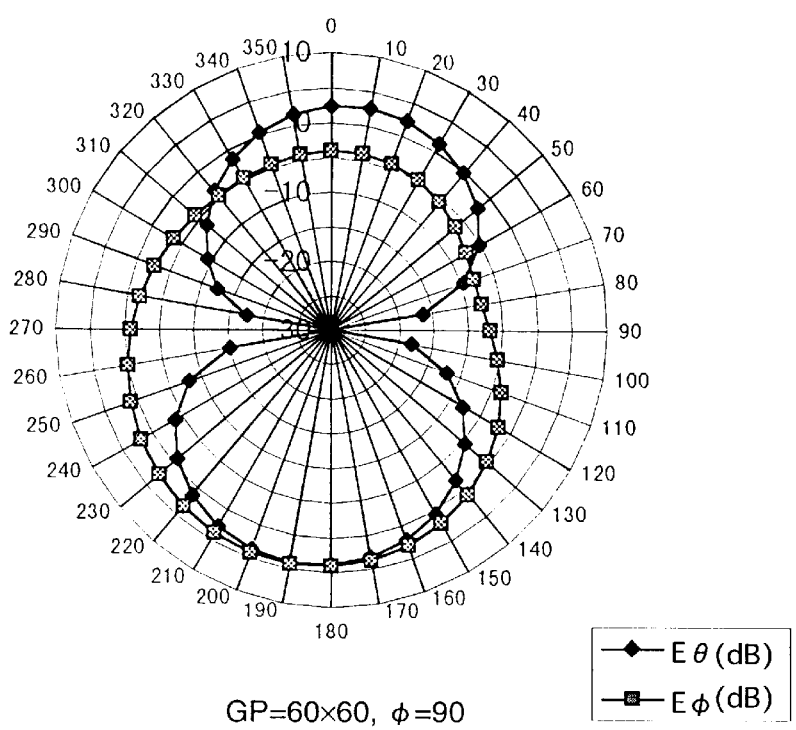
FIG. 10F is a graph showing directivity of the antenna device shown in FIG. 9A when the shield plate of 60 mm×60 mm is used.
Figure 10G:
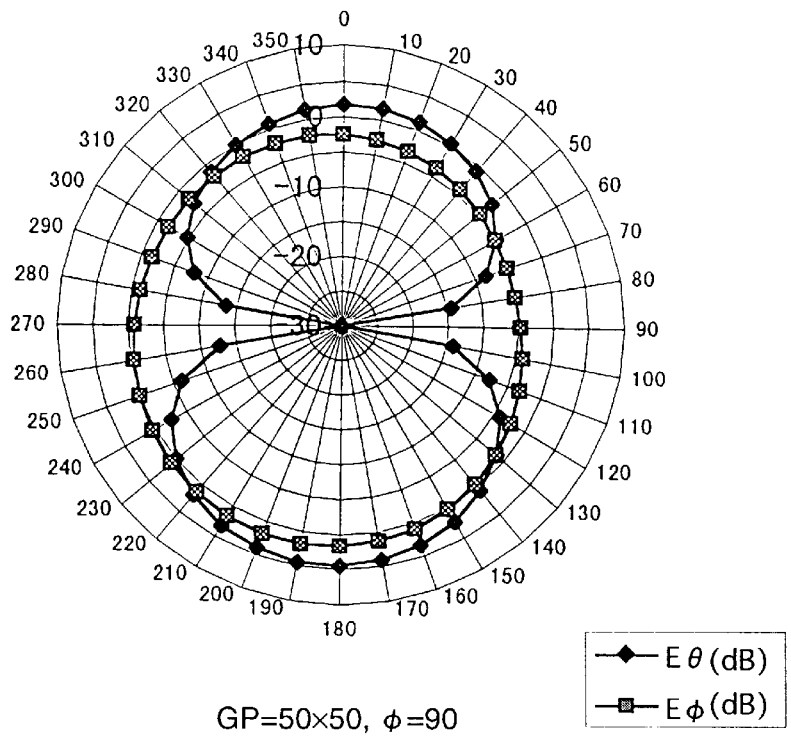
FIG. 10G is a graph showing directivity of the antenna device shown in FIG. 9A when the shield plate of 50 mm×50 mm is used.
Figure 10H:
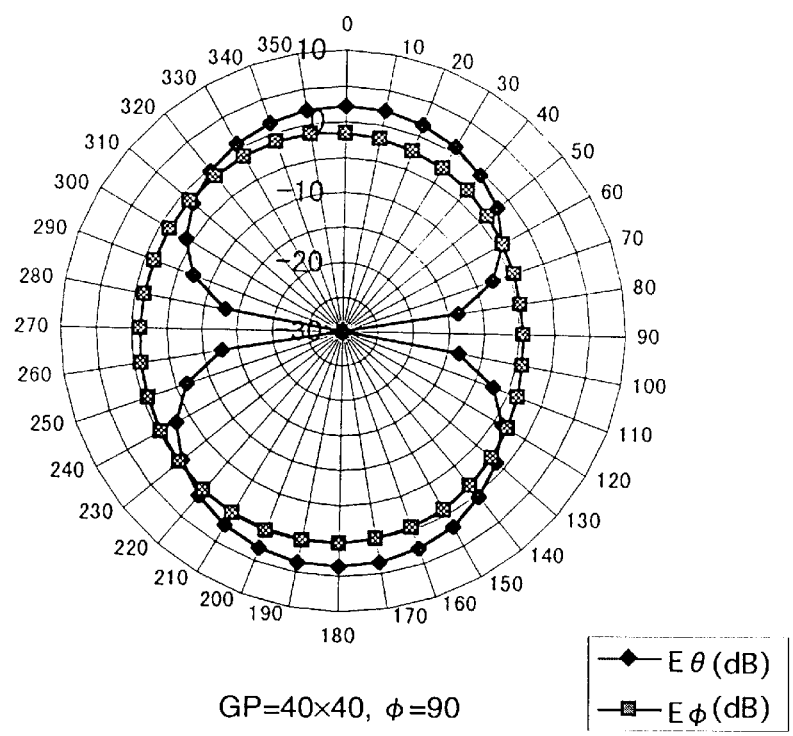
FIG. 10H is a graph showing directivity of the antenna device shown in FIG. 9A when the shield plate of 40 mm×40 mm is used.

In an antenna device 60 shown in FIGS. 9A and 9B, a distance between the antenna element and the shield plate is shorter than that of the antenna device 50 shown in FIGS. 7A and 7B. More specifically, $D_2$ in the antenna device 50 shown in FIGS. 7A and 7B is 30 mm, whereas, in the antenna device 60 shown in FIGS. 9A and 9B, $D_2$ is 15 mm. An antenna element 60a of the antenna device 60 has the size of 59 mm in length and 43.5 mm in width. Further, a supporting member 60c is made of the same material (foamed plastic) as in the foregoing examples. Note, referring to FIG. 9A, when the size of the shield plate 60b is 80 mm×80 mm (FIG. 10D) and 70 mm×70 mm (FIG. 10E), the size of the antenna is set to 45 mm×58.25 mm.

FIGS. 10A to 10H are graphs showing directivity characteristics of the antenna device 60 shown in FIGS. 9A and 9B, measured while changing the GP with the distance $D_2$ fixed to 15 mm. Note, the measurement (FIG. 10D) when the size GP of the shield plate 60b is 80 mm×80 mm and the measurement (FIG. 10E) when 70 mm×70 mm are obtained by changing the size of the antenna 60a to 58.25 mm in length and 45 mm in width.

FIGS. 10A to 10H show result of the experiment on the antenna device 60 shown in FIGS. 9A and 9B. It is found from the graphs of FIGS. 10A to 10H that the same preferred directivity characteristics are obtained when $D_2$ is set to 15 mm, comparing to when $D_2$ is set to 30 mm.

<Second Embodiment>

Figure 11:
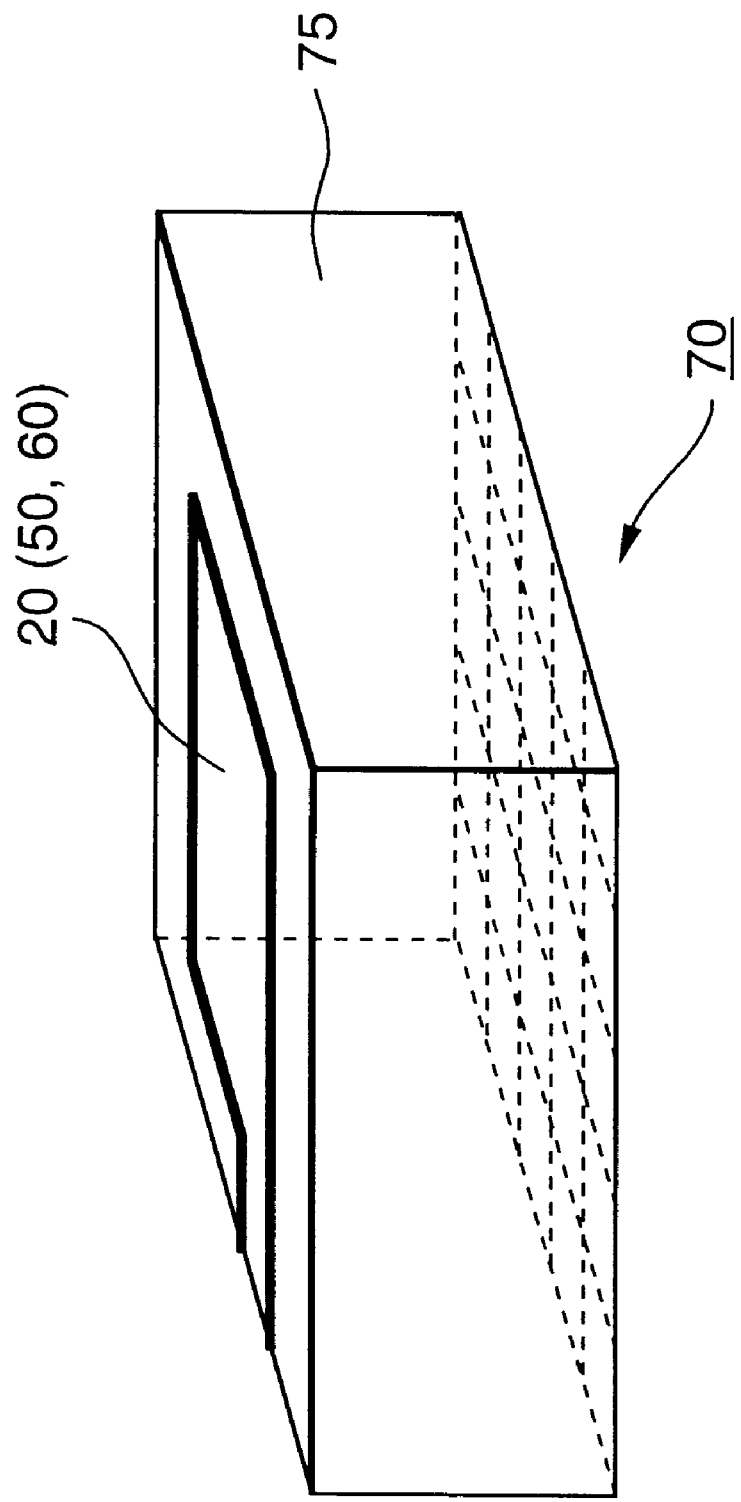
FIG. 11 is a perspective view of an antenna device according to a second embodiment.

FIG. 11 shows a configuration of an antenna device according to the second embodiment. The feature of the second embodiment is that, while the metal shield plate of the first embodiment is made of a plate metal, a shield plate 70 of the second embodiment is a metal net. The shield plate 70 of the metal net is fixed on a supporting member 75 by an adhesive, for instance. Further, the antenna element 20 (or antenna element 50 or 60) is also fixed on the top surface of the member 75 by an adhesive.

Upon evaluating characteristics of a monopole antenna, technique of analyzing a shape of a car using a wire conductor model of lattice is known. By using the approximation model with lattice having about $0.1\lambda$ meshes and the radius of the wire conductor of about $0.005\lambda$ for a monopole antenna, it is said that the satisfactory monopole antenna to be used in practice is realized.

By applying the foregoing theory to the antenna device of the second embodiment (FIG. 11), it is known that a loop antenna element operates in the optimum state when the shield plate 70 has about $\lambda/10$ meshes.

<Third Embodiment>

Application to a GPS Antenna

In a GPS antenna, as described above, it is necessary to arrange a balanced antenna element within an instrument panel which includes a lot of metal conductor, such as an instrument panel member and harness. For an antenna device under the foregoing circumstances, the antenna device of the present invention is suited.

The antenna device of the first embodiment has strong upward directivity when the loop antenna element 20 (or 50a, 60a) is arranged so as to be parallel to the horizontal plane. Further, by arranging the shield plate 30 (or 50b or 60b) on the metal conductor of a vehicle, the shield plate 30 blocks undesired effects of the conductor. Accordingly, as an application of the present invention, an antenna device for GPS having directivity to radio waves from above and having a function of blocking undesired effects of a metal conductor below the antenna device is explained in the third embodiment.

Figure 12:
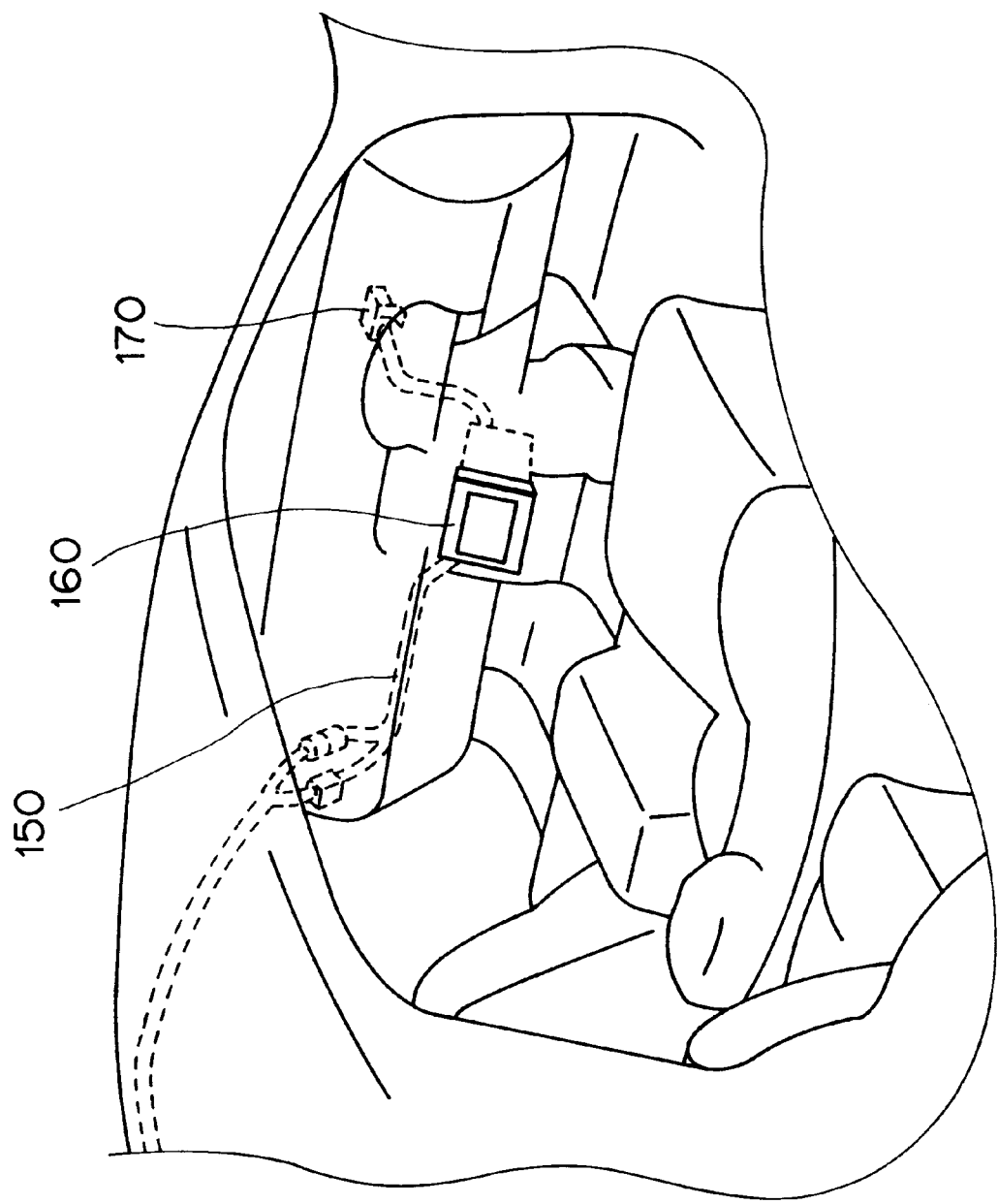
FIG. 12 is an explanatory view for explaining a mounted state of an antenna device on a car (instrument panel) according to a third embodiment.

FIG. 12 shows an arrangement of the antenna device of either the first or second embodiment mounted in an instrument panel as an antenna device 170, and a terminal of the antenna device is connected to a navigation apparatus 160. Reference numeral 150 denotes an antenna feeder cable.

Figure 13:
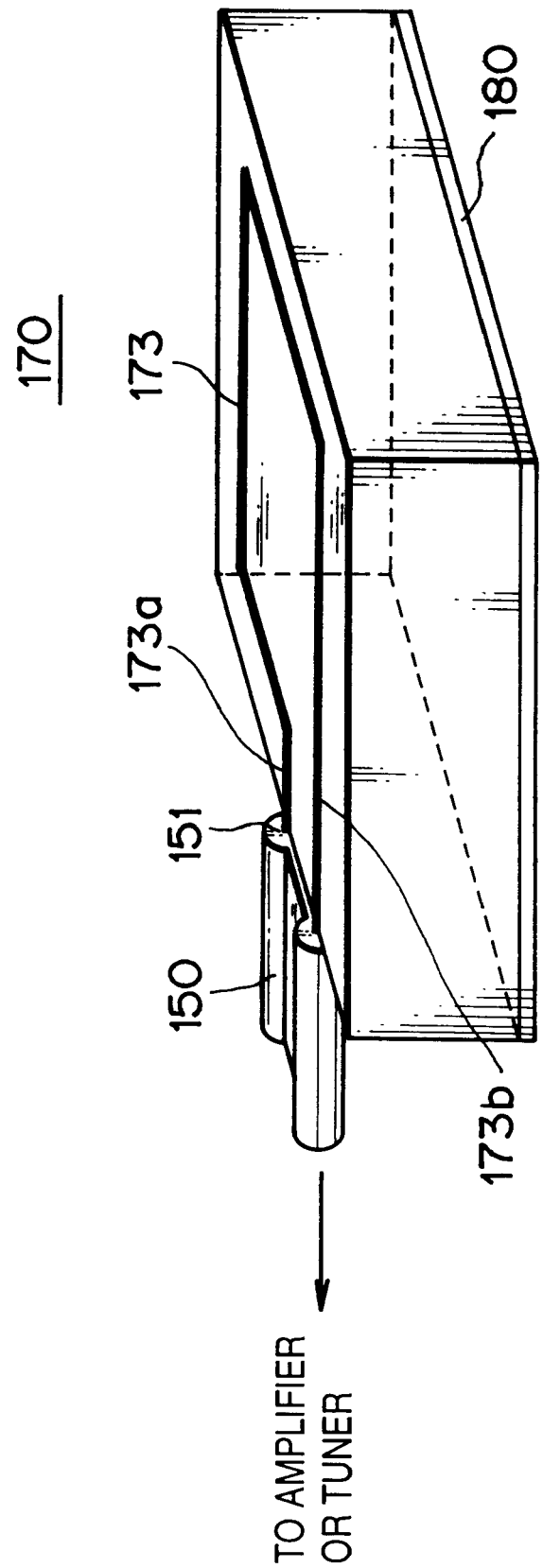
FIG. 13 is a view showing a configuration of the antenna device shown in FIG. 12.

FIG. 13 shows a detailed configuration of the antenna device 170.

The antenna device 170 comprises a rectangular loop antenna element 173, a shield plate 180 made of metal, a supporting member 175 (made of foamed plastic) sandwiched between the element 173 and the shield plate 180 and supporting them, and a connector 151 for connecting to the feeder cable 150. Two lead wires 173a and 173b of the antenna element 173 are respectively connected to terminals of the feeder cable 150 in the connector 151.

In the antenna device 170 in FIG. 13, the antenna element 173 and a metal conductor (not shown in FIG. 13) of a vehicle are arranged on opposite side of the metal shield plate 180 so that the metal shield plate 180 becomes effective. An example of mount procedure is explained with reference to FIGS. 14 and 15.

Figure 14:
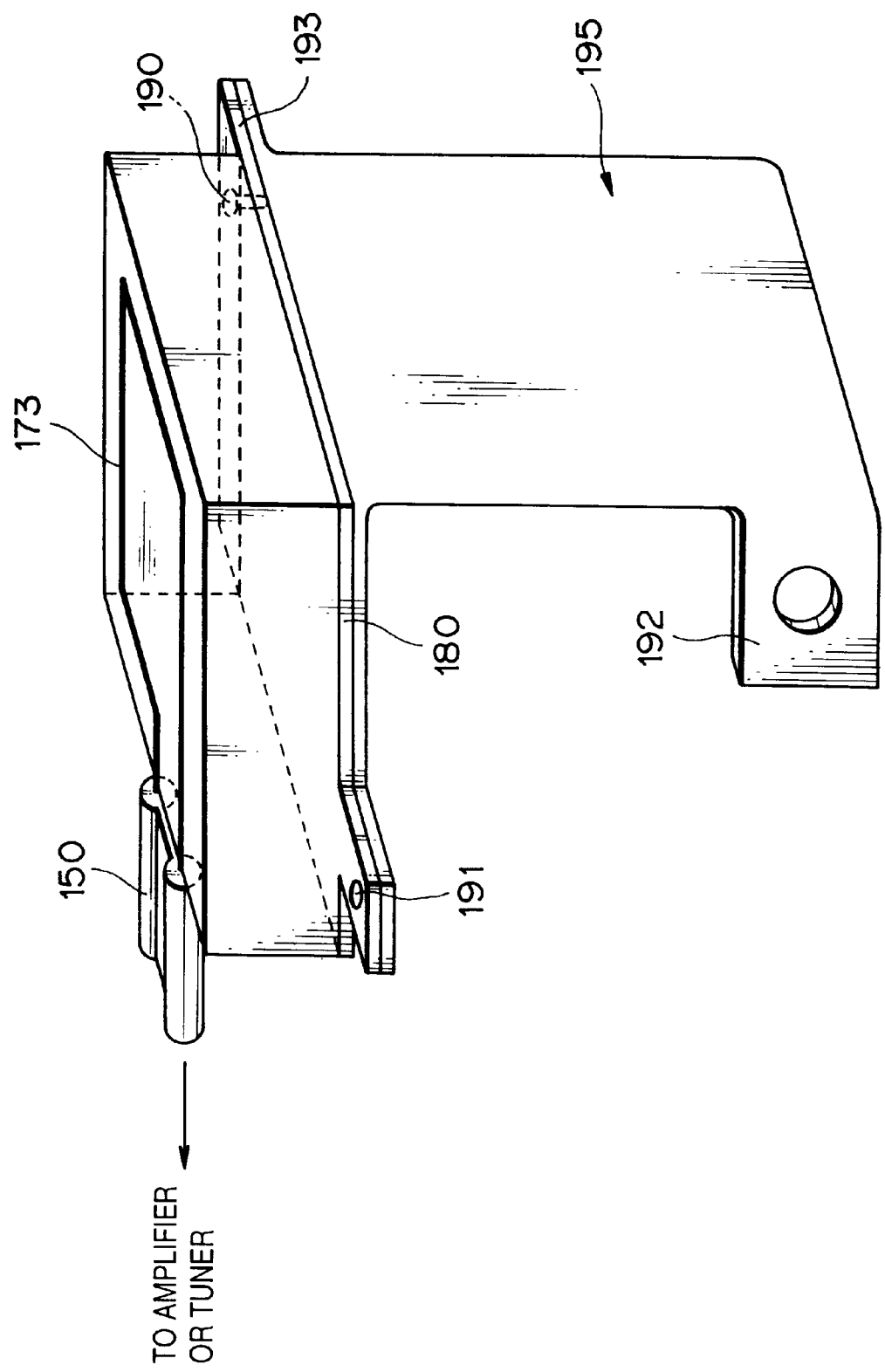
FIG. 14 is an explanatory view for explaining a mount member of the antenna device, shown in FIG. 12, on the car.
Figure 15:
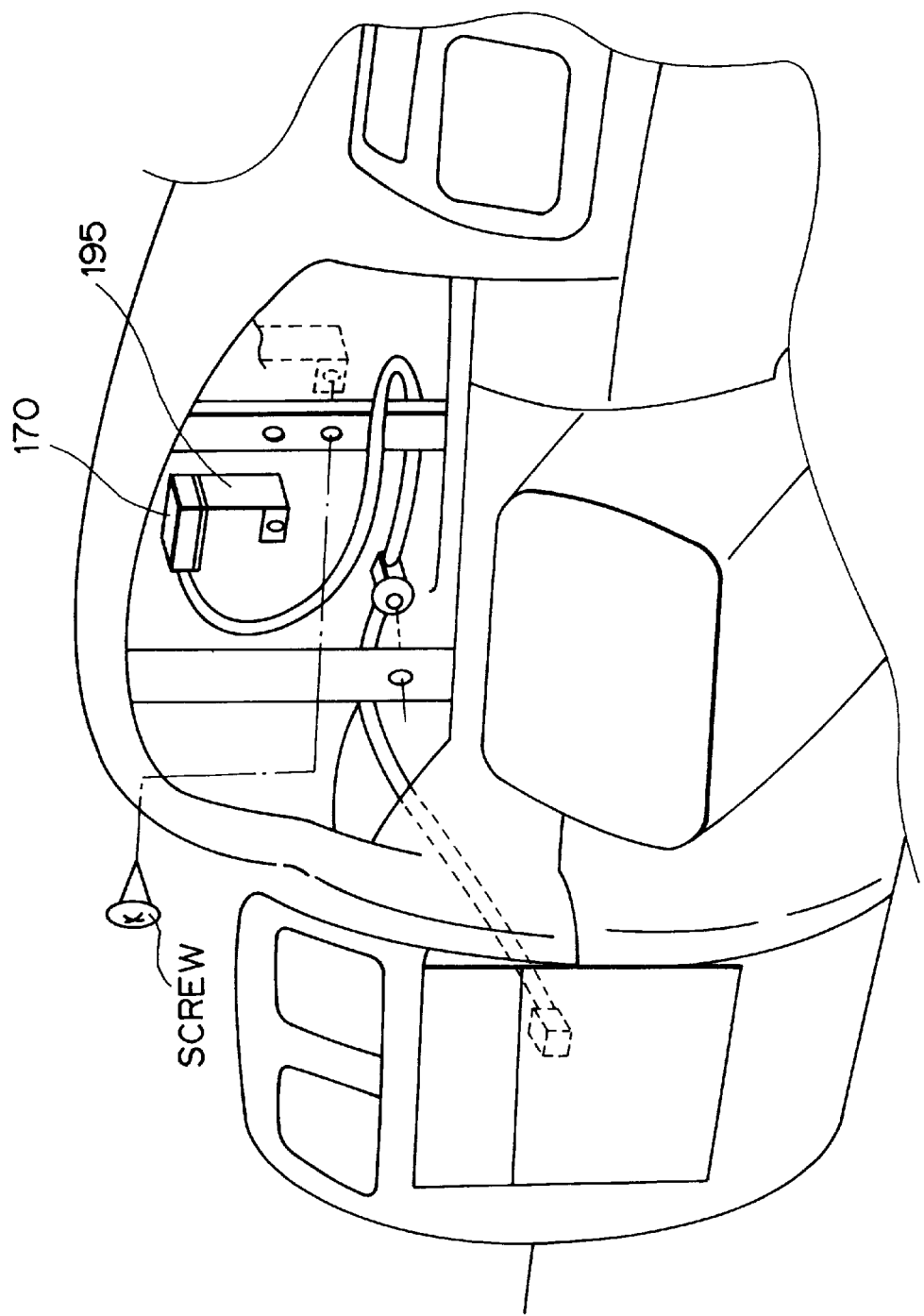
FIG. 15 is an explanatory view for explaining a mounted state of the antenna device, shown in FIG. 12, on the car.

The antenna device shown in FIG. 14 has a configuration of the antenna device 170 in FIG. 13 that is added with a fastening member 191 (with a vis hole) and a flange 193 provided on the shield plate 180 so as to use the shield plate 180 as fitting. The shield plate 180 is fixed to a fitting bracket 195 with a vis using the fastening member 191 and a vis hole 190 of the flange 193. As shown in FIG. 15, this assembly of the antenna device is fixed inside of the instrument panel of a vehicle via the bracket 195.

By mounting the shield plate 180 to the bracket 195 with a vis and mounting the bracket 195 to a metal portion of a vehicle, the shield plate 180 is grounded.

<Modification>

The antenna device of the present invention is not limited to a use of car, but applicable to any types of vehicles.

Further, the antenna device is used in GPS as per in the foregoing embodiments, however, the antenna device of the present invention is applicable to other utilization.

Furthermore, the shape of a loop antenna and the shape of a shield plate are not limited to rectangular, and may be, e.g., a circle or an ellipse.

Further, the supporting member in the above embodiments is made of foamed plastic, however, other material (e.g., dielectric material) may be used.

Regarding the position of the shield plate of the antenna device of the present invention, when directivity of the antenna element is taken into consideration, it is preferable that the position of the antenna element be decided, first, so as to achieve the desired directivity, then decide the position of the shield plate depending upon the mounting position of the antenna element on, e.g., a car.

According to the present invention as described above, an antenna device has a balanced antenna element and an antenna member having a function of blocking electrical coupling, and by arranging the antenna member between the balanced antenna element and a conductor of an external apparatus, it is possible to provide the small and inexpensive antenna device capable of easily shielding the antenna device from effects of the external conductor while maintaining good directivity.

The present invention is not limited to the above embodiments and various changes and modifications can be made within the spirit and scope of the present invention. Therefore to apprise the public of the scope of the present invention, the following claims are made.

What is claimed is:

1. An antenna device comprising:
a loop shaped antenna element to receive GPS signals;
an antenna member to block electrical coupling of a conductor of an external apparatus with said loop shaped antenna element; and
a supporting member to support said antenna member at a predetermined distance from said loop shaped antenna element to isolate said supporting member from said loop shaped antenna element,
wherein the conductor is a conductor in an instrument panel of a vehicle,
said antenna member is arranged between said loop shaped antenna element and the conductor when an assembly of said antenna device is mounted inside of the instrument panel,
the assembly of said antenna device is fixed inside of the instrument panel via a fitting member to fix said antenna member so that said antenna member is below said loop shaped antenna element and above the conductor, and
said loop shaped antenna element includes two lead wires are respectively connected to a navigation apparatus via a feeder cable, and said antenna device and the navigation apparatus are separately arranged inside of the instrument panel.

2. The antenna device according to claim 1, wherein said antenna member has a plate conductor member provided independent of said loop shaped antenna element.

3. The antenna device according to claim 1, wherein, when the assembly of said antenna device is mounted inside of the instrument panel, said antenna member is fixed to the fitting member and the fitting member is fixed to a metal portion of the vehicle to ground the antenna member.

4. The antenna device according to claim 2, wherein an effective area of said plate conductor member perpendicular to the direction toward the external apparatus from said plate conductor member is greater than an effective area of said loop shaped antenna element perpendicular to the direction.

5. The antenna device according to claim 2, wherein said supporting member is filled between said loop shaped antenna element and said plate conductor member with insulating material.

6. The antenna device according to claim 2, wherein said supporting member supports said plate conductor member and said loop shaped antenna element so as to be substantially parallel to each other.

7. The antenna device according to claim 2, wherein said plate conductor member is metal plate.

8. The antenna device according to claim 2, wherein said plate conductor member is formed by a metal net.

9. The antenna device according to claim 8, wherein each mesh of the metal net is designed smaller than about one-tenth of wavelength $\lambda$ of a radio wave of interest.

10. The antenna device according to claim 2, wherein an effective area of said plate conductor member is set larger than $9\lambda^2/64$ when wavelength of a radio wave of interest is $\lambda$.

11. The antenna device according to claim 2, wherein said plate conductor member has a rectangular shape whose sides are equal or longer than $3\lambda/8$.

12. The antenna device according to claim 11, wherein said plate conductor member is a square.

13. The antenna device according to claim 1, wherein said antenna member has a conductor member having function of blocking electrical coupling, and said fitting member fixes said antenna member so that said conductor member is isolated from the conductor in the instrument panel.

14. The antenna device according to claim 1, wherein said fitting member is an adhesive layer.

15. The antenna device according to claim 1, wherein, when a wavelength of a radio wave to be received is $\lambda$, said supporting member supports said antenna member at a distance between $\lambda/25$ and $\lambda/2$ from said loop shaped antenna element.

16. The antenna device according to claim 1, wherein the assembly of said antenna device is mounted inside of the instrument panel by fixing said fitting member to said antenna member.

* * * * *

UNITED STATES PATENT AND TRADEMARK OFFICE
CERTIFICATE OF CORRECTION

PATENT NO.    : 6,115,001                                Page 1 of 1
DATED         : September 5, 2000
INVENTOR(S)   : Tatsuaki Taniguchi et al.

It is certified that error appears in the above-identified patent and that said Letters Patent is hereby corrected as shown below:

Title page,
Item [30] Foreign Application Priority Data, change "August 2, 1997 9-237272" to -- September 2, 1997 9-237372 --.

Drawings,
Please delete drawing sheets FIGS. 1A-F, FIGS. 2A-H and FIG. 21, and substitute drawing sheets FIGS. 1A-F, FIGS. 2A-H and FIG. 21 as per attached.

Column 1,
Line 51, change "$E_{74}$" to -- $E_\theta$ --;
Line 55, change "$E_{74}$" to -- $E_\theta$ --;
Line 65, change "$E_\theta$" to -- $E_\phi$ --.

Signed and Sealed this

Sixteenth Day of April, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.    : 6,115,001
DATED         : September 5, 2000
INVENTOR(S)   : Tatsuaki Taniguchi et al.

It is certified that error appears in the above-identified patent and that said Letters Patent is hereby corrected as shown below:

Title page,
Item [30], Foreign Application Priority Data, change "August 2, 1997  9-237272" to -- September 2, 1997  9-237372 --.

Drawings,
Please delete drawing sheets FIGS. 1A-F, FIGS. 2A-H and FIG. 21, and substitute drawing sheets FIGS. 1A-F, FIGS. 2A-H and FIG. 21 as per attached.

Column 1,
Line 51, change "$E_{74}$" to -- $E_\theta$ --;
Line 55, change "$E_{74}$" to -- $E_\theta$ --;
Line 65, change "$E_\theta$" to -- $E_\phi$ --.

This certificate supercedes Certificate of Correction issued April 16, 2002.

Signed and Sealed this

First Day of April, 2003

JAMES E. ROGAN
*Director of the United States Patent and Trademark Office*